US006751645B1

(12) United States Patent
Gorshtein et al.

(10) Patent No.: US 6,751,645 B1
(45) Date of Patent: Jun. 15, 2004

(54) METHODS AND APPARATUS FOR PERFORMING PIPELINED SRT DIVISION

(75) Inventors: Valery Y. Gorshtein, Moscow (RU);
Yuri N. Parakhin, Moscow (RU);
Vitaly M. Pivnenko, Moscow (RU)

(73) Assignee: Elbrus International Limited, George Town Grand Cayman (KY)

( * ) Notice: Subject to any disclaimer, the term of this patent is extended or adjusted under 35 U.S.C. 154(b) by 575 days.

(21) Appl. No.: 09/712,461

(22) Filed: Nov. 14, 2000

Related U.S. Application Data

(63) Continuation-in-part of application No. 09/505,660, filed on Feb. 17, 2000, now abandoned.
(60) Provisional application No. 60/120,529, filed on Feb. 17, 1999.

(51) Int. Cl.[7] .................................................. G06F 7/52
(52) U.S. Cl. .................................... 708/650; 708/656
(58) Field of Search ................................. 708/504, 650, 708/653, 654, 655, 656

(56) References Cited

U.S. PATENT DOCUMENTS 5,128,891 A * 7/1992 Lynch et al. ............... 708/656
5,140,545 A * 8/1992 Vassiliadis et al. ......... 708/654

* cited by examiner

Primary Examiner—Chuong Dinh Ngo
(74) Attorney, Agent, or Firm—Townsend and Townsend and Crew LLP

(57) ABSTRACT

An SRT division unit for performing a novel SRT division algorithm is presented. The novel SRT division algorithm comprises a method for performing SRT division using a radix r. As one skilled in the art will appreciate, the radix r dictates the number of quotient-bits k generated during a single iteration. The relationship between radix r and the number of quotient-bits k generated in a single iteration is $r=2^k$. The number of iterations needed to determine all quotient-digits is N, such that N=54/k for a 64 bit floating point value. In accordance with one embodiment of the present invention, the SRT division unit generates a scaling factor M, which comprises scaling sub-factors M1 and M2 according to the relationship M=r*M1+M2. Next, the division unit generates a scaled divisor Y by multiplying a divisor DR by scaling factor M, such that said scaled divisor Y=DR*M=r(DR*M1)+DR*M2. In addition, the division unit generates partial remainder values w[00] and w[0] by muliplying a dividend DD by scaling sub-factor M1 and scaling factor M, respectively. Partial remainder value w[00]=DD*M1, and partial remainder value w[0]=DD*M= r(DD*M1)+DD*M2. Scaled divisor Y and partial remainders w[0] and w[00] then are used to generate quotient-digits and additional partial remainders. Accordingly, the division unit performs iterations j which generate quotient-digits according to the formula $q[j]=SEL(r^2*w_{msb}[j-2], q[j-1])$. Also, the iterations generate additional partial remainders w[j] according to the formula w[j]=rw[j-1]-q[j-1]*Y. N iterations are performed, generating all quotient-digits for the division operation.

87 Claims, 12 Drawing Sheets

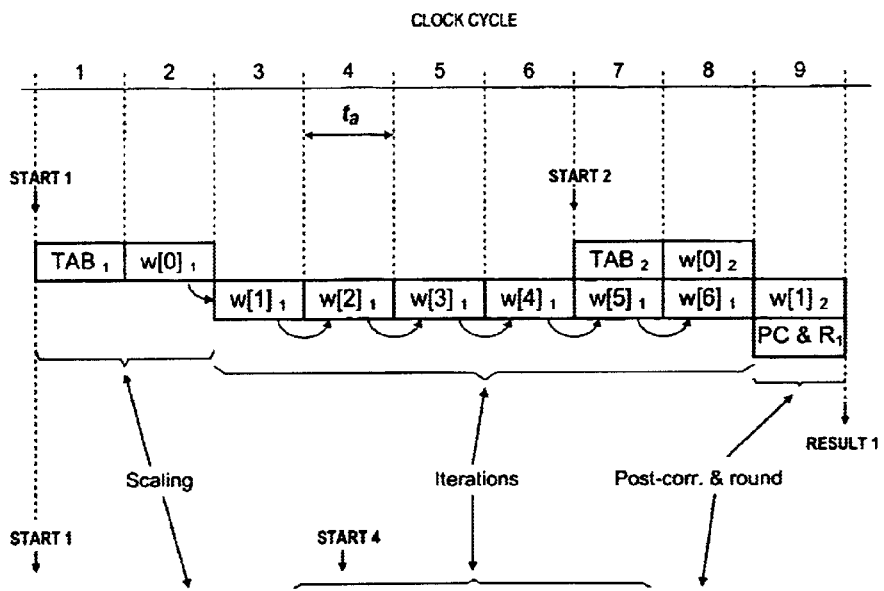
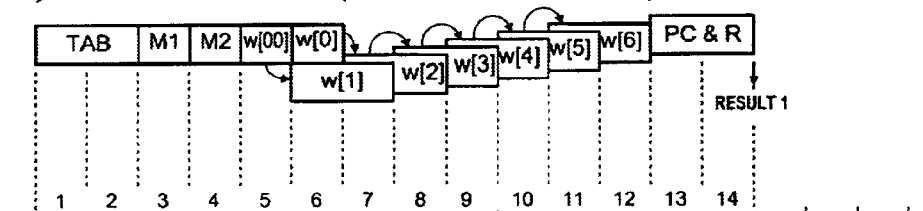
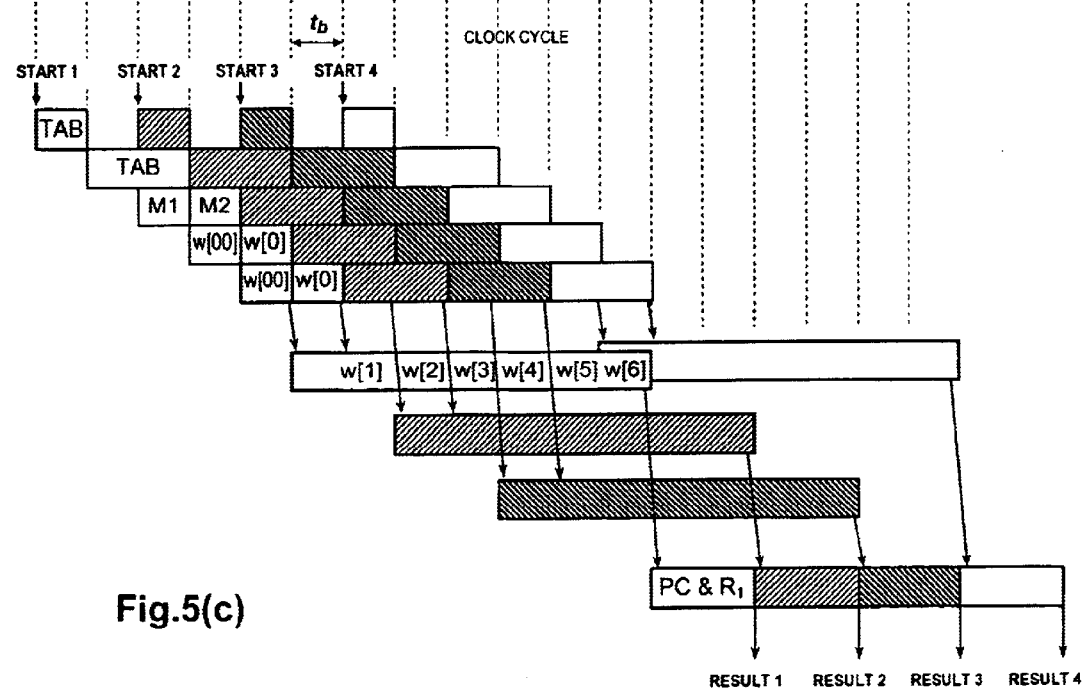
Fig.5(a) (Prior Art)
Fig.5(b)
Fig.5(c)

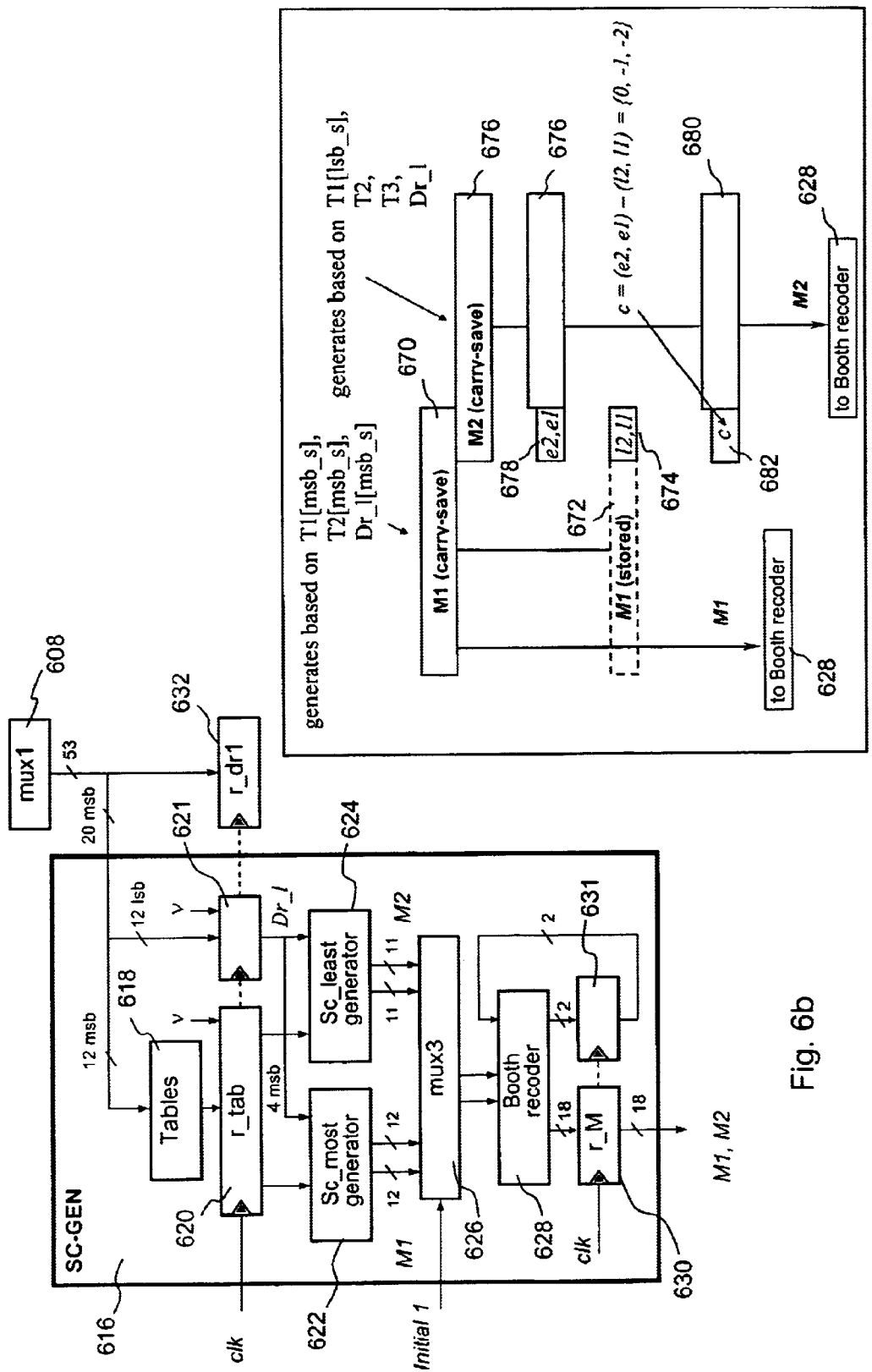

| clock cycle | 1 | 2 | 3 | 4 | 5 | 6 |
|---|---|---|---|---|---|---|
| r_dd | | DD | | | | |
| r_dr | | DR | | | | |
| r_dr 1 | | | DR | | | |
| r_tab | | | TABs | | | |
| mux_3 | | | M1 | M2 | | |
| r_dd2 | | | | DD | | |
| r_dr2 | | | | DR | | |
| r_M | | | | M1 | M2 | |
| mux_5 | | | pp6 | rDR*M1 | | |
| MAC_Dr_out | | | | DR*M1 | Y | |
| MAC_Dd_out | | | | w[00] | w[0] | |
| Dd_out | | | | | w[00] | w[0] |
| Dr_out | | | | | Y | |

Fig. 7

| clock cycle | 5 | 6 | 7 | 8 | 9 | 10 | 11 | 12 | 13 |
|---|---|---|---|---|---|---|---|---|---|
| Dd_scaled | w[00] | w[0] | | | | | * | * | |
| Dr_scaled | Y | | | | | | * | | |
| mux_1 | w[00] | w[0] | w[1] | w[2] | w[3] | w[4] | * | * | * |
| mux_2 | • | rw[0] | rw[1] | rw[2] | rw[3] | rw[4] | rw[5] | * | * |
| r_dr_it | • | | Y | | | | | | |
| RECOD | q[1] | q[2] | q[3] | q[4] | q[5] | q[6] | * | * | * |
| r_RECOD | • | q[1] | q[2] | q[3] | q[4] | q[5] | q[6] | * | * |
| MAC(level1) | • | w[1] | w[2] | w[3] | w[4] | w[5] | w[6] | * | * |
| MAC(level2) | • | • | w[1] | w[2] | w[3] | w[4] | w[5] | w[6] | * |
| q_acc | • | • | • | $Q_1$ | $Q_{1-2}$ | $Q_{1-3}$ | $Q_{1-4}$ | $Q_{1-5}$ | $Q_{1-6}$ |
| Q_it_out | | | • | | | | | | Q_it |

• – timing for previous operation
* – timing for new operation

Fig. 9

METHODS AND APPARATUS FOR PERFORMING PIPELINED SRT DIVISION

CROSS-REFERENCES TO RELATED APPLICATIONS

This application is a Continuation-In-Part Application of U.S. patent application Ser. No. 09/505,660 filed Feb. 17, 2000, now abandoned, which claims the benefit of U.S. Provisional Patent Application No. 60/120,529, filed Feb. 17, 1999, both of which are incorporated herein by reference for all purposes.

BACKGROUND OF THE INVENTION

The present invention relates generally to methods and apparatus for performing SRT division, and more particularly to a novel division algorithm and associated processing unit for performing SRT division.

Modern microprocessors typically include hardware configured to handle floating-point divide and square-root operations. However, given the complexity of the divide and square-root operations, the performance of these operations is considerably lower than other basic mathematical operations. Division and square-root operations are critical to real applications, so it is important their performance and hardware area requirements are balanced with those of other mathematical operations.

There are two major categories of divide and square-root algorithms, multiplicative and subtractive methods, and within each category a considerable number of design variables. Although once regarded as slow and excessively complicated to implement, advancements in technology have made the subtractive methods of division and square-root calculations the algorithms of choice.

The most common subtractive or digit recurrence division algorithm is the SRT algorithm. SRT stands for D. Sweeny, J. E. Robertson, and K. D. Tocher, who more or less developed division procedures using very similar techniques. With the SRT algorithm, as well as with other subtractive methods, quotients and square-roots are computed directly, one digit per iteration; for this reason, they are also known as digit recurrence algorithms. To reduce the number of iterations, it is advantageous to use the highest possible radix for the quotient-digit representation. However, the complexity of the quotient-digit selection function increases for higher radices, eliminating the advantage of the reduction in the number of iterations.

One method of reducing the quotient-digit selection process for higher radices is by restricting the range of the divisor. Since the quotient-digit selection is most accurate, and thus, quickest as the divisor approaches 1, it is convenient to restrict the divisor to a range close to 1. This "range restriction" can be done by prescaling the divisor. Moreover, to preserve the value of the quotient, either the dividend has to be prescaled also or the quotient postscaled. Divisor and dividend prescaling is well known in the art and is commonly used for high-radix division. However, while prescaling is useful for simplifying quotient-digit selection in high-radix division units, the clock cycle time for these units still can be large, and the complexity and size of the hardware is great.

Thus, what is needed is division unit and division algorithm that performs high-radix division quickly, but with a simplified hardware design.

SUMMARY OF THE INVENTION

According to the present invention, an SRT division unit for performing a novel division algorithm is presented. The novel division algorithm comprises a method for performing division using a radix r. As one skilled in the art will appreciate, the radix r dictates the number of quotient-bits k generated during a single iteration. The relationship between radix r and the number of quotient-bits k generated in a single iteration is $r=2^k$. The number of iterations needed to determine all quotient-digits is N, such that N=n/k, and n is the number of quotient-bits to be generated. For 64-bit floating point notation, n typically is 54.

In accordance with one embodiment of the present invention, the SRT division unit generates a scaling factor M, which comprises scaling sub-factors M1 and M2 according to the relationship M=r*M1+M2. Next, the division unit generates a scaled divisor Y by multiplying a divisor DR by scaling factor M, such that said scaled divisor Y=DR*M=r(DR*M1)+DR*M2. In addition, the division unit generates a first scaled dividend value w[00] and a second scaled dividend value w[0] by muliplying a dividend DD by scaling sub-factor M1 and scaling factor M, respectively. First scaled dividend value w[00]=DD*M1, and second scaled dividend value w[0]=DD*M=r(DD*M1)+DD*M2. Scaled divisor Y and scaled dividend values w[0] and w[00] then are used to generate quotient-digits and additional partial remainders (w[1] to w[N]).

In accordance with this aspect of the invention, the division unit performs a first iteration, which comprises generating a first quotient-digit q[1] using the first scaled dividend value w[00], and generating a partial remainder value w[1] using the first quotient-digit q[1], the scaled divisor Y and a shifted second scaled dividend value rw[0]. The shifted second scaled dividend rw[0] comprises the second scaled dividend w[0] multiplied by the radix r. The partial remainder value w[1] is generated according to the formula w[1]=rw[0]−q[1]*Y.

Next, the division unit performs a second iteration, which comprises generating a second quotient-digit q[2] using the second scaled dividend value w[0] and at least one bit from the first quotient-digit q[1]. In addition, the second iteration comprises generating a partial remainder value w[2] using the second quotient-digit q[2], the scaled divisor Y and a shifted partial remainder rw[1]. The shifted partial remainder rw[1] comprises the partial remainder w[1] multiplied by the radix r. The partial remainder value w[2] is generated according to the formula w[2]=rw[1]−q[2]*Y.

In accordance with the division algorithm of the present invention, the iterations continue until all quotient-digits are generated. As mentioned above, it typically takes N iterations to generate all quotient-digits, where N=n/k and $r=2^k$. Thus, for a radix 512 division unit, k=9 and it takes 6 iterations to generate all the quotient-digits for a 64-bit floating point value. Thus, the division unit performs subsequent iterations j (j=3 to N) until all N iterations are performed and all quotient-digits are generated. In performing the subsequent iterations, the division unit generates a quotient-digit q[j] for iteration j using a partial remainder value w[j−2] from iteration j−2 and at least one bit from a quotient-digit q[j−1] from iteration j−1. In addition, the division unit generates a partial remainder value w[j] using the quotient-digit q[j], the scaled divisor Y and a shifted partial remainder rw[j−1]. The shifted partial remainder rw[j−1] comprises the partial remainder w[j−1] multiplied by the radix r. The partial remainder value w[j] is generated according to the formula w[j]=rw[j−1]−q[j]*Y.

As the quotient-digits q[1] to q[N] are being generated, the division unit accumulates the quotient-digits q[1] to q[N] into a final quotient value Q. In addition, if the division is a floating point division, the division unit will calculate a new exponent value by subtracting the exponent value of the divisor from the exponent value of the dividend. Finally, the division unit will perform post correction and rounding functions in accordance with IEEE Std. 754.

A more complete understanding of the present invention may be derived by referring to the detailed description of preferred embodiments and claims when considered in connection with the figures, wherein like reference numbers refer to similar items throughout the figures.

BRIEF DESCRIPTION OF THE DRAWINGS

FIG. 5a is a timing diagram illustrating SRT division steps and clock cycles associated therewith for prior art SRT division units;

FIG. 5b is a timing diagram illustrating SRT division steps and clock cycles associated therewith for one embodiment of an SRT division unit of the present invention;

FIG. 5c is an expanded timing diagram showing multiple division operations and the clock cycles associated therewith for one embodiment of an SRT division unit of the present invention;

FIG. 6b is a more detailed schematic diagram of the scaling factor generation unit of the preprocessing unit illustrated in FIG. 6a;

FIG. 6c is a block diagram illustrating the relationship between scaling sub-factors M1 and M2;

FIG. 7 is a block diagram illustrating the contents of the various components of the preprocessing unit illustrated in FIG. 6, and the clock cycles at which those components have those contents;

FIG. 9 is a block diagram illustrating the contents of the various components of the iteration unit illustrated in FIG. 7, and the clock cycles at which those components have those contents;

DESCRIPTION OF THE SPECIFIC EMBODIMENTS

The present invention relates generally to methods and apparatus for performing SRT division, and more particularly to a novel division algorithm and associated processing unit for performing SRT division. While the SRT division unit and SRT division algorithm are disclosed herein as being part of a particular processor architecture, one skilled in the art will appreciate that the novel SRT division unit and SRT division algorithm of the present invention may be used with any suitable processor architecture. Therefore, the present invention is not limited to the processor architecture disclosed herein.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

A. System Architecture Overview

Figure 1:
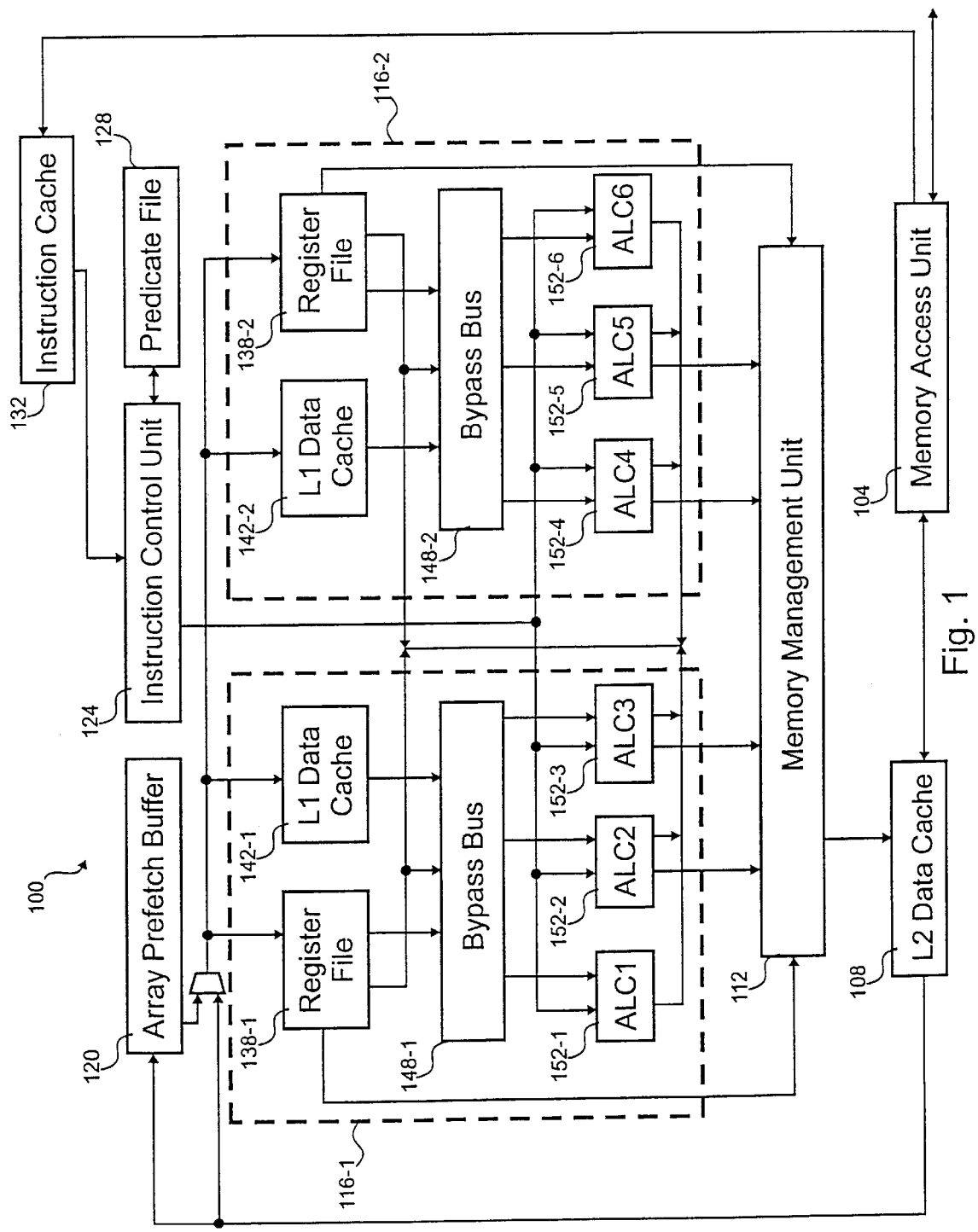
FIG. 1 is a block diagram of a processor architecture that may embody the division unit of the present invention.

Referring first to FIG. 1, an overview block diagram of an embodiment of an explicitly parallel instruction computing (EPIC) system 100 is shown. This system or microprocessor 100 employs mechanisms to avoid the code inefficiencies in traditional VLIW machines to increase the number of instructions processed per cycle. To that end, this architecture moves the complex job of instruction scheduling from the microprocessor 100 to the compiler. Included in this embodiment 100 are a memory access unit 104, level two (L2) data cache 108, a memory management unit 112, two processing clusters 116, an array prefetch buffer 120, an instruction control unit 124, a predicate file 128, and an instruction cache 132.

Processing is divided between the two processing clusters 116. Each processing cluster 116 has a general purpose register file 138, a level one (L1) data cache 142, a bypass bus 148, and three arithmetic logic channels (ALCs) 152. The register files 138 and L1 data caches 142 are unified between the clusters 116 to reduce data shuffling, eliminate fragmentation loss, and eliminate memory incoherence.

The memory access unit 104 is an interface for communicating between the microprocessor 100 and external memory at an exchange rate of up to four information words transferred during a cycle. The memory access unit contains an entry buffer for memory requests and a crossbar of four data and one group instruction cache 132 memory access channels to four physical memory channels. The two least significant bits (LSBs) of physical addresses are the physical memory channel number.

To decrease the number of accesses to memory, the L1 and L2 data caches 142, 108 buffer data and the instruction cache 132 buffers instructions. The instruction cache 132 is sixty-four kilobytes (KB) large and has a 4-way configuration, the L1 data cache 142 is eight KB large, and the L2 data cache 108 is two hundred and fifty-six KB large and has a four bank, two-way, configuration. The instruction cache 132 contains wide instruction words in a packed form which is the same way the wide instructions are stored in memory. Other embodiments could increase cache 108, 132, 142 sizes and/or configurations, if sufficient die area is available.

The memory management unit (MMU) 112 contains a four-port data translate lookaside Buffer (DTLB) with sixty-four entries and performs hardware search in the page table of DTLB in the case of a cache miss. The MMU 112 also contains disambiguation memory for checking rearrangement correctness of load and store operations, performed by an optimizing compiler.

The array prefetch buffer (APB) 120 is used to prefetch from memory array elements for loops. The APB 120 includes a four-channel first-in first-out (FIFO) buffer and contains forty-eight registers in each channel. The registers are at least sixty-four bits wide. Data are transferred from the APB 120 to the general purpose register files 138 when the data are ready.

The instruction control unit 124 generates wide instructions words in an unpacked form, transforms indirect based operands addresses of wide instruction word to absolute addresses in a register file 138, checks the conditions of the wide instruction word, and distributes the wide instruction word to the arithmetic logic channels 152. The instruction control unit 124 also checks instruction issue conditions, such as no exception conditions, no interlock conditions between other arithmetic logic channels 152, and availability of operands in the register file 138.

The predicate file 128 stores predicate values generated by integer and floating point compare operations. Predicate values are used to control the conditional execution of operations and are used to move branch conditions to the end of software loops. Included in the predicate file 128 are thirty-two predicate registers that are each two-bits wide. One bit in each predicate register holds the predicate value and the other bit holds an inverse of the predicate value.

There are two general-purpose register files 138, one register file 138 for each processing cluster 116. There are two hundred and fifty-six registers in the register file 138 and each register is sixty-four bits wide. Both floating point and integer operations use the same register file 138 and ports to that register file 138. Each copy of the register file 138 has ten physical read and ten physical write ports for a total of twenty logical read and ten logical write ports. Data are written to both register files 138 and the L1 data caches 142 to ensure memory coherency.

The register file 138 has a pipelined design and uses the same data lines for read and write with a half clock shift. There are allocated less than two clock cycles in the microprocessor pipeline for access the data in the register file 138. The large size of the register file 138 of this embodiment provides for fast execution of code because the register file 138 holds an increased number of intermediate results and local variables from the running code. This size of the register file 138 substantially decreases the number of memory accesses.

Procedure calls and program boundaries require considerable time to save and restore a large number of registers. For this reason, the microprocessor 100 supports a variable size register window mechanism with a current procedure register base that points to the beginning of current procedure area in the register file 138 or predicate file 128. A real physical register address is calculated by adding an increment value from the register address in instruction to the value of procedure base. On a procedure call or program boundary, the window is advanced by adding to the procedure register base.

There are six ALCs 152 in the microprocessor 100 arranged with three ALCs 152 in each processing cluster 116. The ALCs 152 work in parallel and have nearly the same sets of arithmetic and logic operations. Table I shows which operations may be executed by which ALCs 152. All ALCs 152 receive operands from register file 138 and bypass buses 148. The bypass busses 148 relieve bus conflicts when delivering the operators for some operations.

TABLE I

| Operation | ALC Number | | | | | |
|---|---|---|---|---|---|---|
| | 1 | 2 | 3 | 4 | 5 | 6 |
| Integer ALC | x | x | x | x | x | x |
| Interger Combined | | x | | | x | |
| Load/Store L1 | x | | x | x | | x |
| Load/Store L2 | x | | x | x | | x |
| Floating Point Add (32/64 bit) | x | x | | x | x | |
| Floating Point Add (80 bit) | x | x | | x | x | |
| Multiply (32/64 bit) | x | x | | x | x | |
| Floating Point Multiply (80 bit) | x | x | | x | x | |
| Floating Point Multiply-Add (32/64 bit) | x | x | | x | x | |
| Divide (32 bit) | | | | | | x |
| Divide (64 bit) | | | | | | x |
| Floating Point Division (32/64 bit) | | | | | | x |
| Multimedia Extension Multiply/Shift | | x | | | x | |
| Multimedia Extension Add/Subtract | x | | | x | | |

Figure 2:
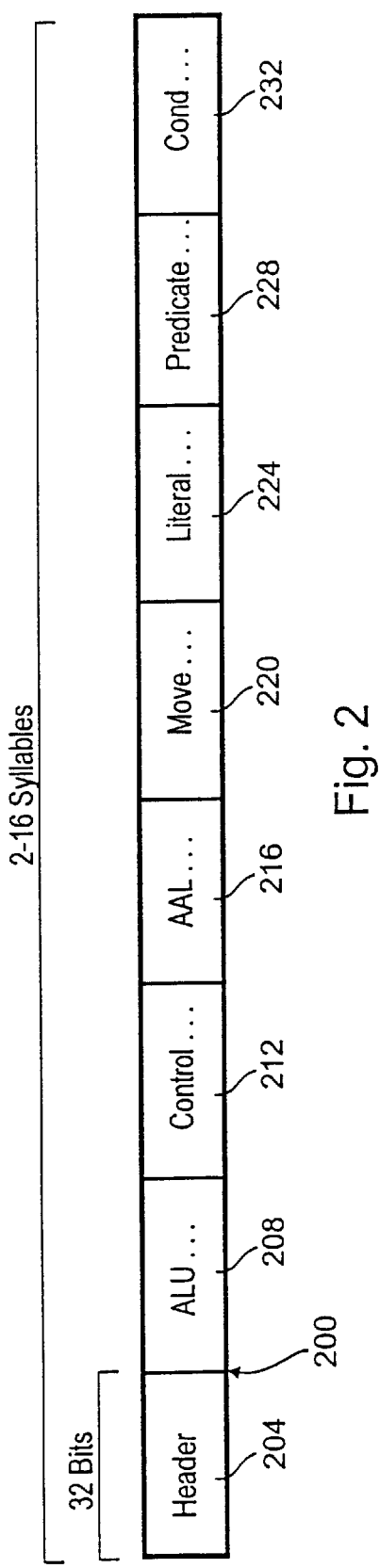
FIG. 2 is a block diagram of a variable-length wide instruction word that may be used by the processor architecture illustrated in FIG. 1.

Referring next to FIG. 2, a diagram of an embodiment of a wide instruction word 200 having a number of syllable types is shown. The microprocessor 100 uses a variable length wide instruction word 200 having anywhere from two to sixteen syllables. The syllables are each thirty-two bits in length. The first syllable is a header 204 that specifies the number and type of syllables in the wide instruction word 200.

The syllables after the header 204 hold instructions that fall into a number of categories. Table II describes the various categories of instructions possible in the instruction word 200. This table also lists the maximum number of instructions possible in each category. Although this embodiment has a maximum of sixteen syllables, other embodiments could have a different amount, for example, thirty-two syllables.

TABLE II

| Syllable Type | Explanation | Max. Number |
|---|---|---|
| Header | Word Length and Structure | 1 |
| ALC | Execution Channel Function(s) | 6 |
| Control | Prepare to Branch Control | 3 |
| AAL | Additional ALC Function for Chained Operations | 2 |
| Move | Move Data from Prefetch Buffer to Register | 4 |
| Literal | Supply Literal to ALC | 4 |
| Predicate | Predicate Logic Calculations | 3 |
| Conditions | Predicate and ALC Masks | 3 |

Figure 3:
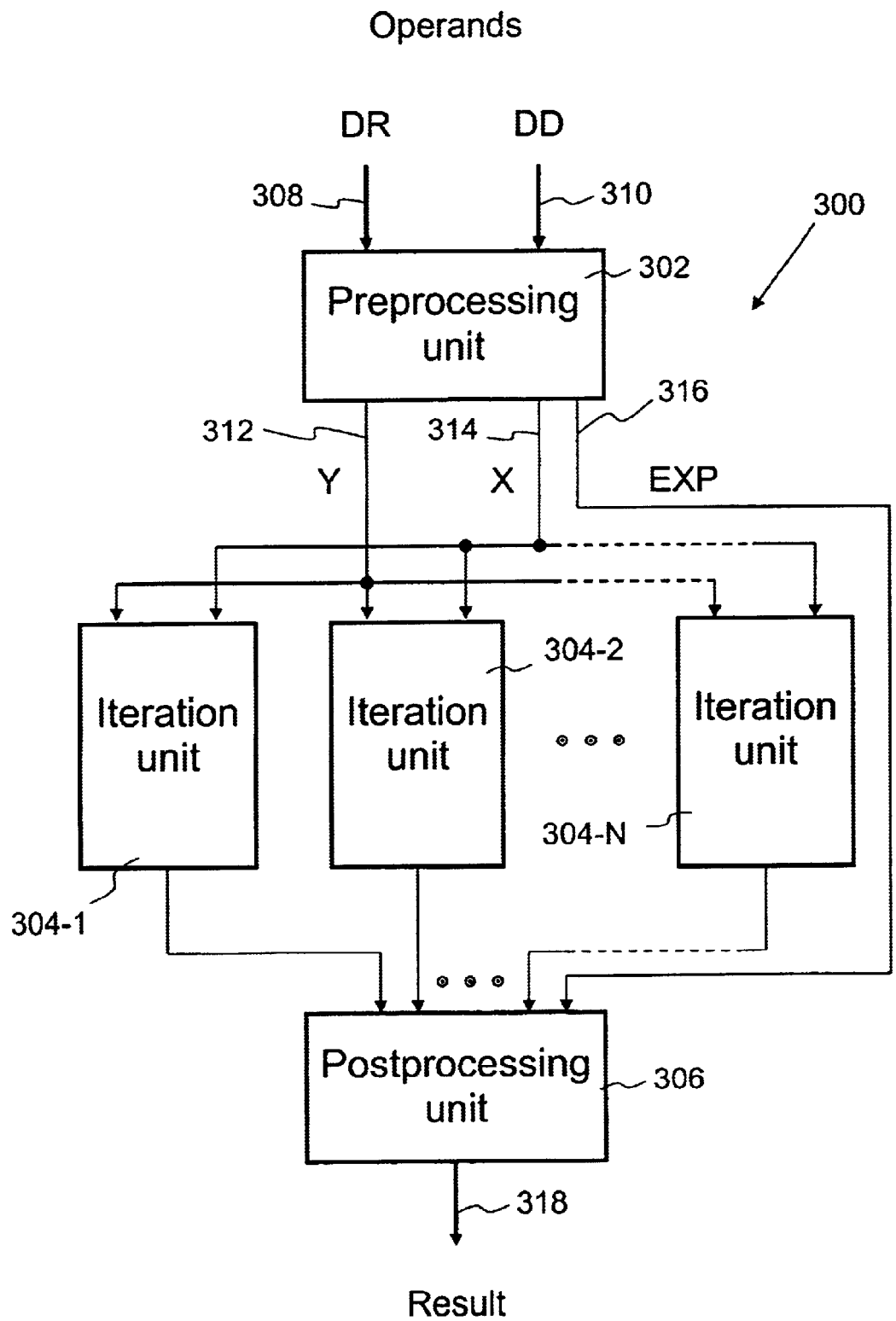
FIG. 3 is a block diagram of one embodiment of an SRT division unit of the present invention.

Referring now to FIG. 3, one embodiment of an SRT division unit 300 in accordance with the present invention is shown. SRT division unit 300 comprises a preprocessing unit 302, a plurality of iteration units 304, and a post processing unit 306. As illustrated in FIG. 3, preprocessing unit 302 receives a divisor 308 and a dividend 310 from a storage location in processor 100. For example, divisor 308 and dividend 310 may pass to preprocessing unit 302 from level 1 data cache 142 or register file 138. Divisor 308 and dividend 310 can be integer values, or single precision or double precision floating-point values. In accordance with the embodiment disclosed herein, divisor 308 and dividend 310 preferably are double precision floating point values, which are represented by 53 bits for the fraction value and 11 bits for the exponent.

As discussed in more detail below, preprocessing unit 302 is configured to normalize the floating point values of divisor 308 and dividend 310, generate a scaling factor M, generate a scaled divisor value (Y) 312 and a scaled dividend value (A) 314, and calculate a new exponent value 316 for the division result. Preprocessing unit 302 then passes the scaled divisor value (Y) 312 and the scaled dividend value (X) 314 to iteration units 304 and passes the new exponent value 316 to post processing unit 306.

Iteration units 304 receive the scaled divisor value (Y) 312 and the scaled dividend value (X) 314 from preprocessing unit 302 and calculate quotient-digits in accordance with the division algorithm discussed below. As one skilled in the art will appreciate, the quotient-digits are generated through a plurality of digit selection and remainder calculation iterations. A detailed discussion of iteration unit 304 and the quotient-digit generation algorithm is discussed in more detail below.

Post processing unit 306 receives the quotient and exponent values from iteration units 304 and preprocessing unit 302, respectively, and rounds and generates the division result in accordance with IEEE standard 754. In addition, post processing unit 306 multiplexes the outputs of the various iteration units 304. The operation of post processing unit 306 is well known in the art. Thus, it will not be discussed in detail herein.

B. Division Algorithm Overview

High-radix SRT division using prescaling and quotient-digit selection is well known in the art. With typical SRT division, the quotient-digits are determined by the formula:

$$q[i+1]=SEL(rw_{msb}[i]); \text{ where}$$

q[i+1]=quotient-digit at iteration "i+1";
SEL=a selection function;
r=the radix; and
$w_{msb}[i]$=the most significant bits of the partial remainder at iteration "i."

Similarly, the partial remainder value at iteration "i+1" is determined by the formula:

$$w[i+1]=rw[i]-q[i+1]*Y; \text{ where}$$

w[i+1]=the partial remainder at iteration "i+1"; and
Y=the scaled divisor.

As is apparent from the above formulas, the quotient-digit at iteration "i+1" (q[i+1]) and the partial remainder at iteration "i+1" (w[i+1]) both are dependent upon the partial remainder from iteration "i" (w[i]). Accordingly, the quotient-digit selection function must wait for the completion of iteration "i" before it can perform iteration "i+1."

In accordance with the novel SRT division algorithm of the present invention, the quotient-digit q[j+1] and partial remainder w[j+1] are computed in accordance with the following formulas, respectively:

$$q[j+1]=SEL(r^2w_{msb}[j-1], q_{lsb}[j]); \text{ where}$$

q[j+1]=the quotient-digit at iteration "j+1";
r=the radix
$w_{msb}[j-1]$=the most significant bits of the partial remainder at iteration "j-1"; and
$q_{lsb}[j]$=the least significant bit of the quotient-digit from iteration "j."

$$w[j+1]=rw[j]-q[j+1]*Y; \text{ where}$$

w[j+1]=the partial remainder at iteration "j+1";

w[j]=the partial remainder at iteration "j";
q[j+1]=the quotient-digit from iteration "j+1"; and
Y=scaled divisor.

In accordance with one embodiment of the present invention, the quotient-digit selection function preferably uses quotient-digit selection by rounding. The quotient-digit selection function of the present invention utilizes the most significant bits of the shifted partial remainder at iteration "j−1" ($r^2*w_{msb}[j-1]$) to calculate the quotient-digit for iteration "j+1" (q[j+1]). In addition, because of the way the rounding occurs with this particular quotient-digit selection function, a digit-correction function also is performed. The digit-selection function uses one or more of the least significant bits of the quotient-digit at iteration "j" ($q_{lsb}[j]$) to calculate a correction bit in the quotient-digit for iteration "j+1" (q[j+1]). One embodiment of a quotient-digit selection function in accordance with the present invention is discussed in more detail below with reference to FIG. 10(b).

The partial remainder for iteration "j+1" (w[j+1]) is calculated by subtracting the product of the quotient-digit at iteration "j+1" and the scaled divisor (q[j+1]*Y) from the shifted remainder at iteration "j" (rw[j]). This is one embodiment of a standard partial remainder calculation for SRT division. The benefit of the present invention is that the quotient-digit at iteration "j+1" (q[j+1]) is calculated two clock cycles prior to the calculation of the partial remainder for iteration "j+1" (w[j+1]), because the quotient-digit at iteration "j+1" (q[j+1]) is a function of the partial remainder at iteration "j−1" (w[j−1]), not the partial remainder at iteration "j" (w[j]), as in the prior art. This will be more apparent from FIGS. 4 and 5, which are discussed in more detail below.

As one skilled in the art will appreciate, the number of quotient-bits generated during a single iteration is dependent upon the radix used. The following formula applies:

$$\text{radix } r=2^k; \text{ where}$$

k=the number of quotient-bits generated during each iteration.

For double precision floating-point values, 54 quotient-bits are generated. Therefore, the number of iterations N needed to generate all 54 quotient-bits is dependent upon the number of quotient-bits k generated during each iteration. Accordingly, the number of iterations N needed to generate all the quotient-bits also is dependent upon the radix. The relationship is as follows:

$$N=54/k$$

In accordance with one embodiment of the present invention, the radix for the present SRT division unit and SRT division algorithm may be 512. Thus, in accordance with the above formula, 9 quotient-bits are generated during each iteration ($512=2^9$), and 6 iterations are needed to generate all 54 quotient-bits (54/9=6). As one skilled in the art will appreciate, if larger precision floating-point values are used (for example, 128-bits), the total number of quotient-bits, and thus the number of iterations needed to generate those bits, will be larger. Also, for ease of understanding, a particular example of one embodiment of the present invention is given herein for a radix 512, k=9, N=6. However, one skilled in the art will appreciate that any suitable radix can be used, and thus, the value of k and N will change according to the radix used. Therefore, the present invention is not limited to radix=512, k=9 and N=6.

Referring now to FIGS. 4 and 5a–c, the timing for generating the quotient-digits and partial remainders for one embodiment of the present invention are illustrated. FIG. 5a illustrates the timing diagram for a prior art SRT division with radix=512 (k=9, N=6). With the prior art SRT division unit, the calculation of the quotient-digits and partial remainders are sequential, because the quotient-digit generation is dependent upon the most significant bits of the partial remainder from the previous iteration; that is, q[i+1]=SEL($rw_{msb}$[i]). Thus, with this particular configuration, a complete division operation takes 9 clock cycles from beginning to end; i.e., from prescaling to post correction and rounding.

Figure 4:
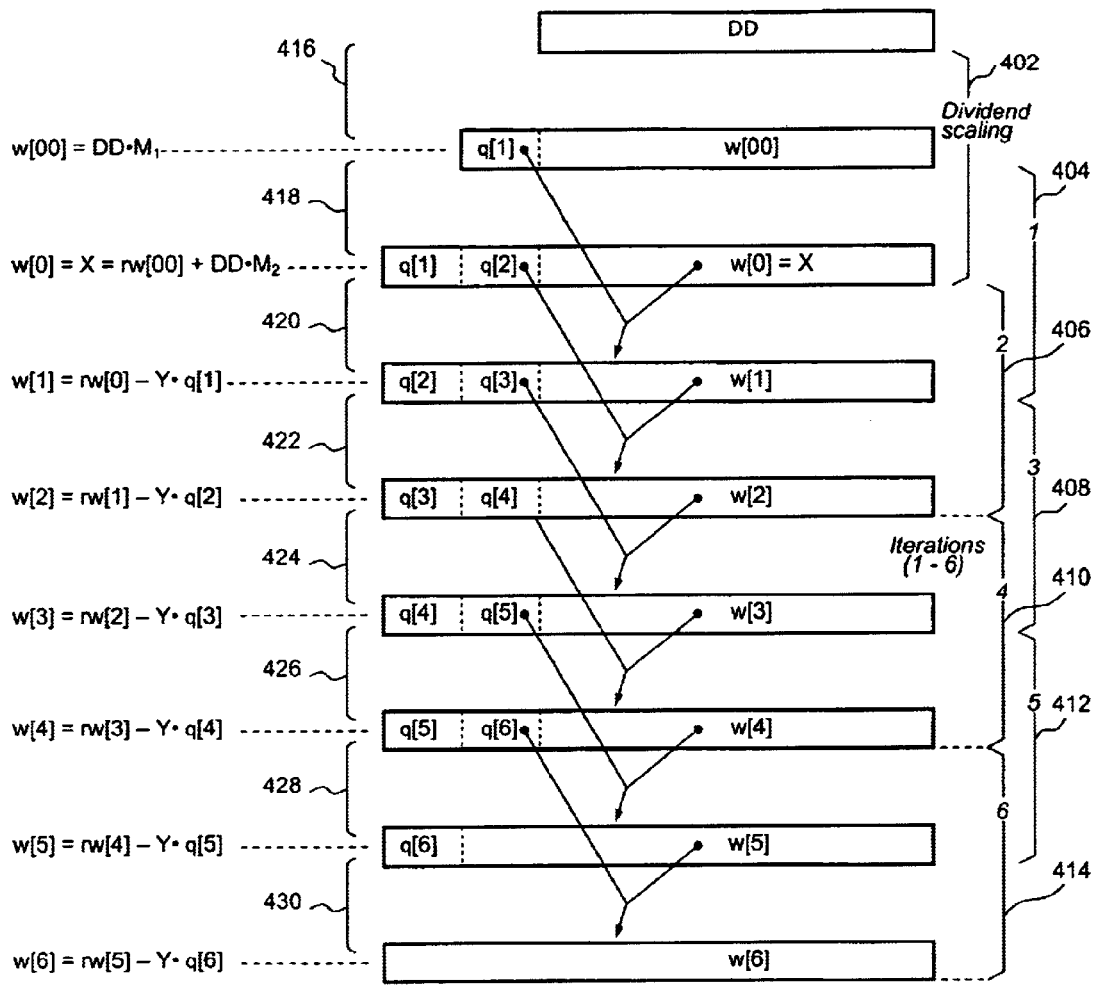
FIG. 4 is a block diagram illustrating SRT division steps.

As illustrated in FIG. 4, each iteration in accordance with the present invention takes two short clock cycles. The benefit of the present invention is that while each iteration takes two short clock cycles, the iterations overlap, so a significant amount of time is saved. For example, dividend scaling 402 occurs during clock cycles 416 and 418. During clock cycle 416, a first scaled dividend value w[00] is generated. During clock cycle 418 a second scaled dividend value w[0] is generated. However, because quotient-digit q[j] is selected using partial remainder w[j−2] instead of partial remainder w[j−1] as in the prior art, the quotient-digit q[j+1] can be generated before w[j] is generated. For example, because first iteration 404 generates quotient-digit q[1] based on first scaled dividend w[00], q[1] also is generated in clock cycle 416. Then, partial remainder w[1] is generated in clock cycle 420 using q[1] and second scaled dividend w[0] generated during clock cycle 418. Similarly, because the second iteration 406 generates quotient-digit q[2] based on second scaled dividend w[0], q[2] is generated in clock cycle 418. Partial remainder w[1], which is generated in clock cycle 420 is then used along with q[2] to generate partial remainder w[2] in clock cycle 422. This overlap of iterations continues for the remaining iterations.

As illustrated in FIG. 5b, a radix 512 division operation requires 6 clock cycles (clock cycles 7–12 in FIG. 5b) to perform the 6 iterations. Even though each iteration takes 2 clock cycles, because the iterations overlap clock cycles, all 6 iterations can be performed in 6 short clock cycles. The clock cycles in FIG. 5b last a length of time $t_b$. Thus the iteration time for the division operation illustrated in FIG. 5b is: $t_{it}=6t_b$.

The radix 512 division operation illustrated in FIG. 5a also requires 6 clock cycles to perform 6 iterations, with each clock cycle lasting a length of time $t_a$. However, because $t_a$ is about twice as long as $t_b$, the iteration time for the division operation illustrated in FIG. 5a is: $t_{it}=6t_a=12t_b$. Thus, the iteration time takes twice as long in the prior art units. In addition, the hardware in the prior art units is more complex.

For a radix 262,144 ($2^{18}$, k=18) division operation using a prior art device, only 3 iterations are required. Thus, the iteration time is: $t_{it}=3t_a=6t_b$. While the iteration time is about the same as in the present invention device, the complexity of the hardware for radix 262,144 (k=18) increases exponentially. Thus, with the present invention method and device, division operation iterations either are twice as fast with less hardware, or about the same speed with exponentially less hardware. In either case, the present invention has considerable advantages. In addition, as illustrated in FIG. 5c, because 3 or more iteration units 304 (FIG. 3) can be configured together, subsequent division operations can overlap a previous division operation after only two short clock cycles. The two short clock cycle delay is caused by preprocessing unit 302.

C. Pre-processing Unit

Figure 6A:
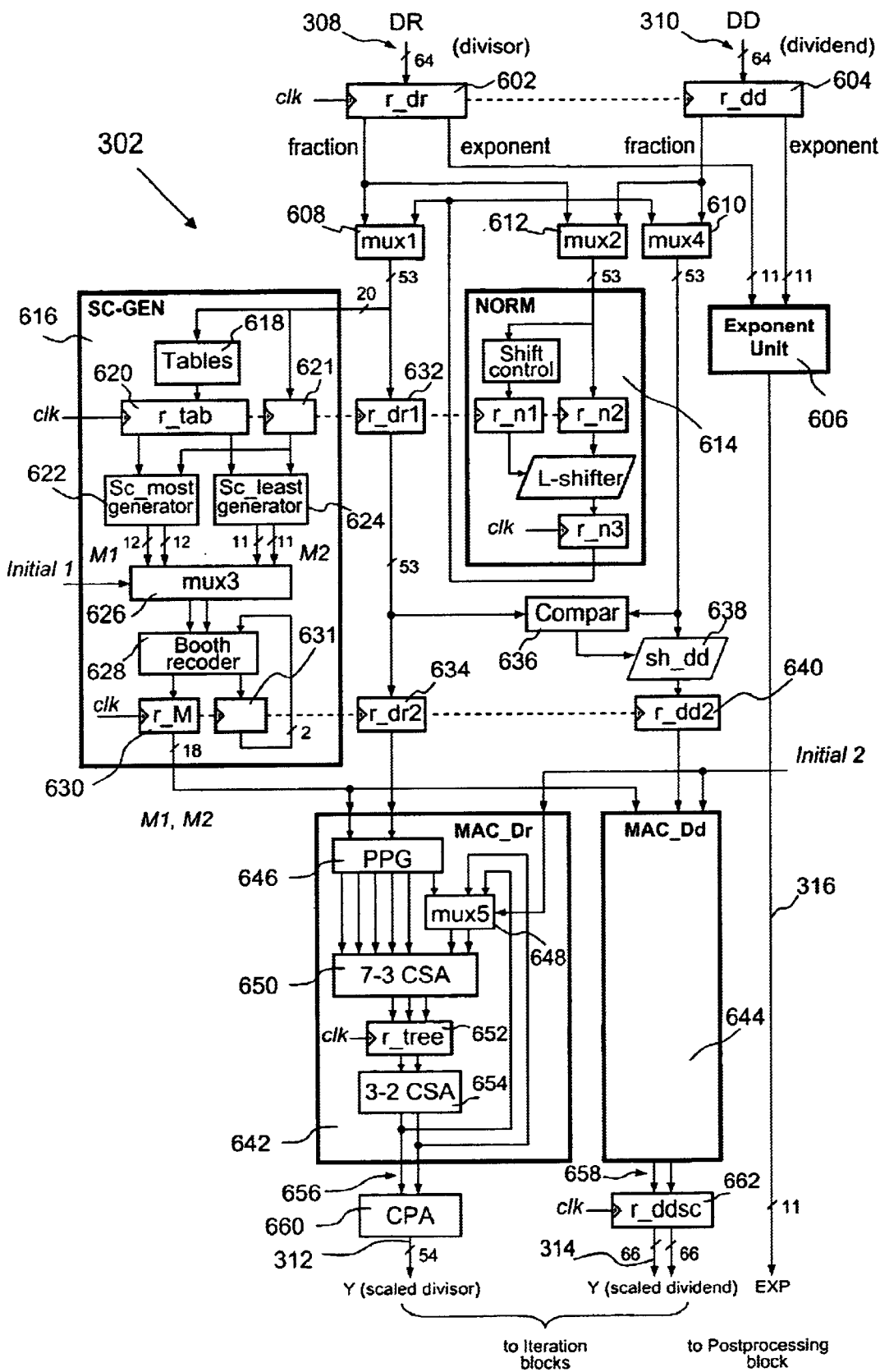
FIG. 6a is a detailed schematic diagram of one embodiment of a preprocessing unit embodied in the SRT division unit illustrated in FIG. 3.

Referring now to FIG. 6a, the configuration and operation of preprocessing unit 302 will be discussed. Preprocessing unit 302 receives divisor 308 and dividend 310 values in floating point form and stores them in a divisor register 602 (labeled r_dr in FIG. 6a) and a dividend register 604 (labeled r_dd in FIG. 6a), respectively. Preprocessing unit 302 then normalizes the floating point values of divisor 308 and dividend 310, if necessary, and generates a scaling factor M. Preprocessing unit 302 uses scaling factor M to generate a scaled divisor value (Y) 312 and a scaled dividend value (X) 314. In addition, preprocessing unit 302 calculates a new exponent value 316 from the exponent portions of divisor 308 and dividend 310 and passes it to post processing unit 306. Post processing unit 306 combines the new exponent value 316 with the quotient-digits generated by iteration unit 304 to form the division operation result. In accordance with one embodiment of the present invention, preprocessing unit 302 passes scaled divisor (y) 312 to iteration unit 304 in single vector form and passes scaled dividend (A) 314 to iteration unit 304 in carry-save form.

1. Exponent Calculation

As one skilled in the art will appreciate, for floating point division, the result exponent value is calculated by subtracting the 11 bit exponent value of divisor 308 from the 11 bit exponent value of dividend 310. Thus, in accordance with the present invention, preprocessing unit 302 comprises an exponent unit 606, which receives the 11 bit exponent value of divisor 308 from divisor register 602 and the 11 bit exponent value of dividend 310 from dividend register 604 and performs the subtraction operation, generating the result exponent value 316. Preprocessing unit 302 then passes result exponent 316 to post processing unit 306, so it can be combined with the calculated quotient-digits. The calculation of result exponent 316 typically takes about two clock cycles. Because the quotient-digit generation process takes much longer than two clock cycles, the exponent calculation process has no effect on the execution time of the division operation.

2. Normalization

Prior to performing a division operation, it is preferable that the operands be in a normal form. Thus, if the fraction portions of divisor 308 and/or dividend 310 are not normalized, preprocessing unit 302 will perform the normalization operation. As illustrated in FIG. 6a, the 53 fraction bits of divisor 308 pass from divisor register 602 into a first multiplexer ("MUX") 608 (labeled MUX1 in FIG. 6a) and a second MUX 612 (labeled MUX2 in FIG. 6a). Similarly, the 53 fraction bits of dividend 310 pass from dividend register 604 into a fourth MUX 610 (labeled MUX4 in FIG. 6) and second MUX 612. If divisor 308 and/or dividend 310 are not in normal form, the operand(s) not in normal form will pass from second MUX 612 into a normalization unit 614. In accordance with one embodiment of the present invention, normalization unit 614 operates as a standard normalization unit currently known in the art. Therefore, the detailed configuration and operation of normalization unit 614 will not be discussed in detail herein.

If the fraction portion of divisor 308 is normalized by normalization unit 614, the new normalized value passes from normalization unit 614 into first MUX 608. First MUX 608 then selects the appropriate divisor value and passes it to the rest of the preprocessing unit. Similarly, if the fraction portion of dividend 310 is normalized by normalization unit 614, the new normalized value passes from normalization unit 614 into fourth MUX 610, which then selects the appropriate dividend value and passes it to the rest of the preprocessing unit.

3. Scaling Factor Generation

As mentioned above, the higher the radix used for division, the more complicated the quotient-digit selection becomes. One means of simplifying the quotient-digit selection for high-radix division is to pre-scale the divisor and dividend prior to performing the division iterations. In accordance with one embodiment of the present invention, a scaling factor M is selected so that the scaled divisor Y (Y=M*DR) is as close to 1 as possible. Preferably, the scaling factor M is selected such that the scaled divisor Y lies in the range:

$$(0.FFFFE8)_{hex} < Y < (1.000018)_{hex}$$

Scaling factor M is generated in scaling factor generation unit 616, which, in accordance with one embodiment of the present invention, utilizes a piecewise-linear approximation method to generate scaling factor M. For a detailed discussion of a piecewise-linear approximation method which may be used in the present invention, see for example, M. Ito, N. Takagi and A. Yajima, "Efficient Initial Approximation and Fast Converging Methods of Division and Square Root," In Proc. 12th IEEE Symposium on Computer Arithmetic, pages 2–9, 1995, the entirety of which is incorporated herein by reference for all purposes.

Referring now to FIGS. 6a–6d, another means for generating scaling factor M is shown. In accordance with this particular embodiment of the present invention, scaling sub-factors M1 and M2 are generated, and scaling factor M is determined from scaling factors M1 and M2 according to the formula:

$$M = r*M1 + M2$$

To generate scaling sub-factors M1 and M2, a scaling factor generation unit 616 is used. As illustrated in FIGS. 6a and 6b, the 20 most significant bits of the fraction portion of divisor 308 ("$DR_{20msb}$") pass from first MUX 608 into scaling factor generation unit 616. The 12 most significant bits of $DR_{20msb}$ are used by a table select unit 618 to select table values, and the 12 least significant bits of $DR_{20msb}$ are loaded into register Dr_1 621. Table select unit 618 uses the 12 most significant bits of $DR_{20msb}$ to select table values T1, T2 and T3 from one or more stored tables.

Figure 6D:
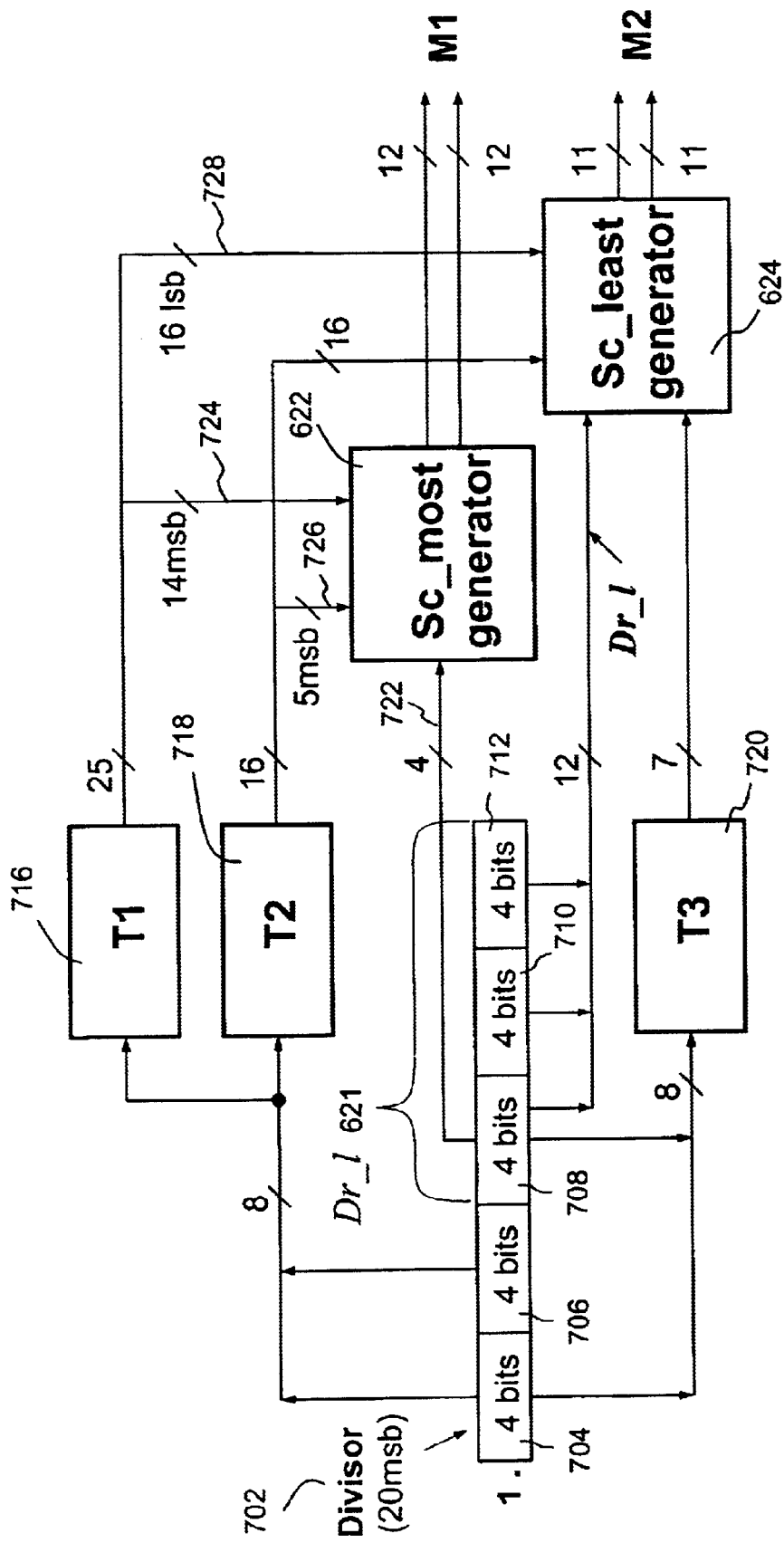
FIG. 6d is a block diagram illustrating how scaling factor generation unit generates values M1 and M2.

Referring now to FIG. 6d, the generation of scaling sub-factors M1 and M2 will be discussed in more detail. As mentioned above, the 20 most significant bits of the fraction portion of divisor 308 pass into scaling factor generation unit 616. In FIG. 6d, $DR_{20msb}$ 702 is illustrated as 5, 4-bit values 704, 706, 708, 710, and 712. Dr_1 621 is illustrated as values 708, 710, and 712. As illustrated in FIG. 6d, table value T1 comprises 25 bits, table value T2 comprises 16 bits, and table value T3 comprises 7 bits. The 8 most significant bits 704 and 706 of $DR_{20msb}$ 702 are used to generate table values T1 716 and T2 718, and the 4 most significant bits 704 of $DR_{20msb}$ 702 and the 4 most significant bits 708 of Dr_1 621 are used to generate table value T3 720.

Table values T1, T2, and T3 and Dr_1 are used to generate scaling sub-factors M1 and M2 in accordance with the following formulas:

$$M1 = T1_{14msb} + T2_{5msb} * Dr\_1_{4msb}$$

$$M2 = T1_{16lsb} + T2 * Dr\_1 + T3$$

In accordance with these formulas, and as illustrated in FIG. 6d, Dr_$1_{4msb}$ 722 is the 4 most significant bits of Dr_1, T1$_{14msb}$ 724 is the 14 most significant bits of T1, T2$_{5mssb}$ 726 is the 5 most significant bits of T2, and T1$_{16lsb}$ 728 is the 16 least significant bits of T1.

M1 comprises a 12 bit rounded value in carry-save form, and M2 comprises an 11 bit rounded value in carry-save form. In addition, M2 may be adjusted/corrected according to the least significant bits of M1 and two extra bit of M2.

Referring now to FIG. 6c, the correction/adjustment of scaling sub-factor M2 will be discussed. First, scaling generation unit 616 generates scaling sub-factor M1 in accordance with the formula above. Sub-factor M1 in carry-save form passes from scaling sub-factor generating unit 622 to third MUX 626, and then to booth recoder 628. As one skilled in the art will appreciate, booth recoder 628 is configured to recode sub-factor M1 into radix 4, booth notation form. The value of M1 then is stored in register 630. In addition, the 2 least significant bits of the single vector value of M1 may be stored in a separate register 631. The 2 least significant bits then will be used in calculating the correcting bits for sub-factor M2. The value of M1 is illustrated in FIG. 6c as single vector value 672. In addition, the 2 least significant bits of M1 are illustrated in FIG. 6c as bits l2 and l1 674. While bits l2 and l1 674 are illustrated in FIG. 6c as part of M1 (which they are), one skilled in the art will appreciate that these values also may be stored in a separate register, for example register 631, so that they may be used by sub-factor generating unit 624 or booth recoder 628 to calculate the correction bits for M2.

In the next clock cycle, scaling factor generation unit 616 generates sub-factor M2 according to the above formula. As illustrated in FIGS. 6a and 6b, sub-factor M2 is an 11 bit value in carry-save form, which is illustrated in FIG. 6c as M2 value 676. Sub-factor M2 includes two "extra bits" e2 and e1 678, which are used in conjunction with bits l2 and l1 674 of sub-factor M1 to calculate the correction bits c 682. The bits e2 and e1 are the two least significant bits of the two most significant positions of the M2 sum. The correction bits c 682 are calculated as follows:

$$c = (e2, e1) - (l2, l1) = (0, -1, -2)$$

Figure 10A:
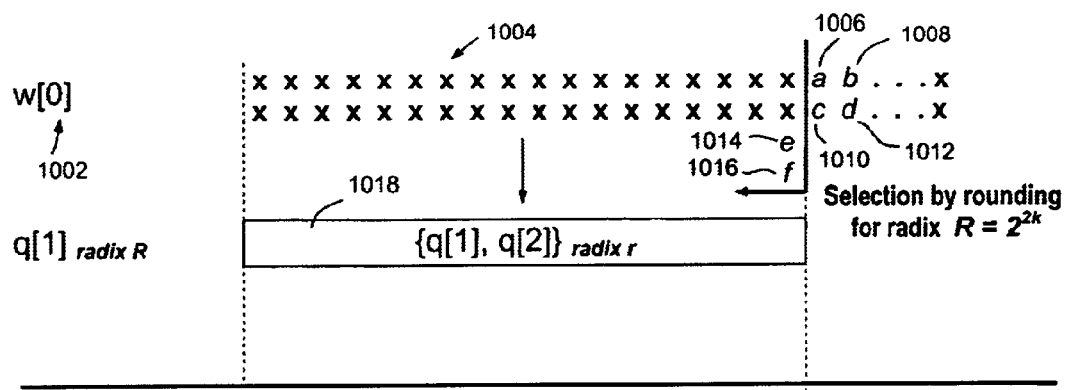
FIG. 10a is a block diagram illustrating the quotient-digit selection by rounding processing utilized by a prior art SRT division unit.
Figure 10B:
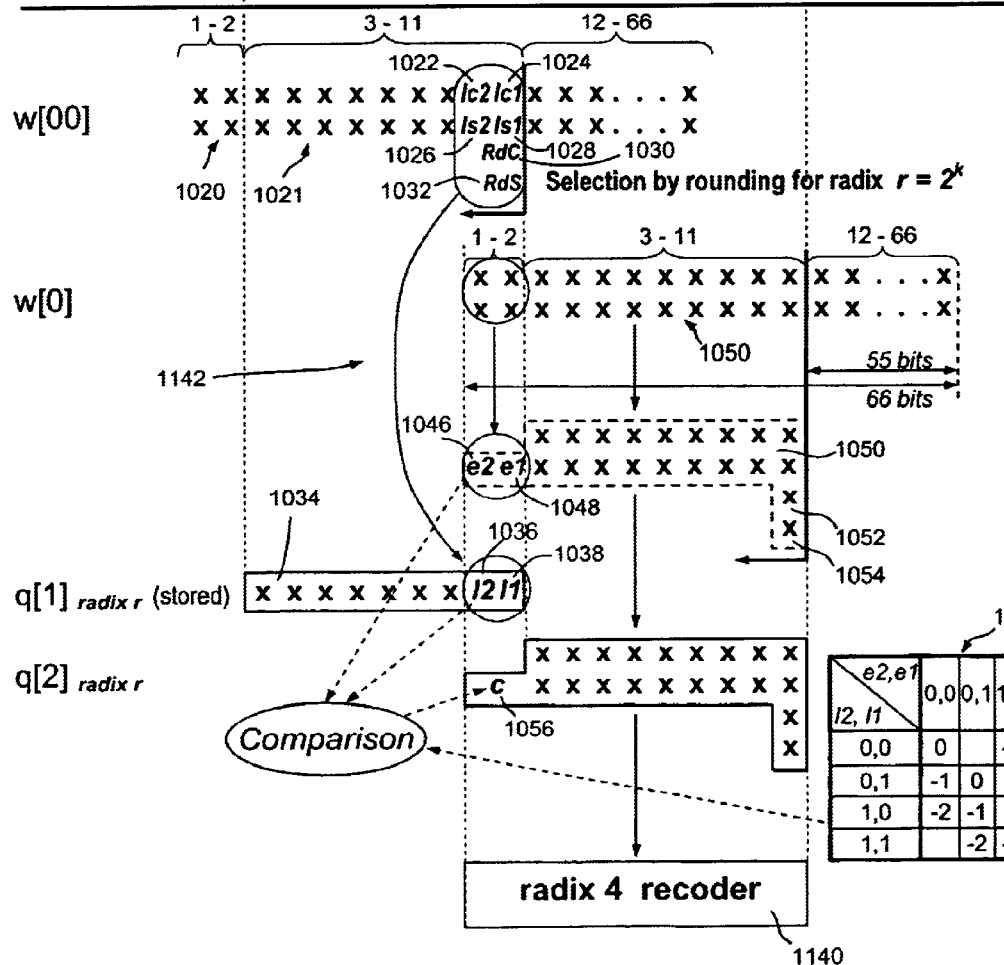
FIG. 10b is a block diagram illustrating one embodiment of a quotient-digit selection by rounding and correction process that may be utilized by the SRT division unit of the present invention.

Table 1060 in FIG. 10b illustrates the values of correction bits c 682 for given values of e2, e1, l2, and l1.

The correction bits c 682 are used to generate the final sub-factor M2 value. Sub-factor M2, including the correction bits, pass through a recoder, such as booth recoder 628, which recodes sub-factor M2 into radix 4, booth notation form. M2 is then stored in register 630 and passed to divisor scaling unit 642 and dividend scaling unit 644.

While the illustrated embodiment of the present invention shows booth recoder 628 generating the correction bits c 682, one skilled in the art will appreciate that other hardware may be configured to generate these bits. For example, sub-factor generating unit 624 may be configured to perform this function. Therefore, the present invention is not limited to the illustrated embodiment.

4. Divisor/Dividend Scaling

As illustrated in FIG. 6a, the fraction bits of divisor 308 are loaded from first MUX 608 into a first divisor register 632, and then into a second divisor register 634 before passing into divisor scaling unit 642. Similarly, the fraction bits of dividend 310 are loaded from fourth MUX 610 to a comparator unit 636, which also receives the fraction bits of divisor 308. As one skilled in the art will appreciate, if the fraction value of dividend 310 is less than the fraction value of divisor 308, the most significant bit of the quotient will be zero. This particular relationship between the divisor and dividend may increase the number of iterations needed to generate the quotient. Therefore, if the fraction value of dividend 310 is less than the fraction value of divisor 308, a shift unit 638 will left shift the fraction bits of dividend 310 by one bit. The left shift will eliminate this problem. From shift unit 638, the fraction bits of dividend 610 are loaded into dividend register 640.

Scaling of divisor 308 occurs in divisor scaling/multiplication ("MAC") unit 642 (labeled MAC_Dr in FIG. 6a), and scaling of dividend 310 occurs in dividend scaling/multiplication ("MAC") unit 644 (labeled MAC_Dd in FIG. 6a) Divisor and dividend scaling are performed in two multiplication operations each in accordance with the following formulas:

$$M=r*M1+M2; \text{ so}$$

$$Y=DR*M=r(DR*M1)+DR*M2;$$

$$X=DD*M=r(DD*M1)+DD*M2; \text{ where}$$

DR=the fraction bits of divisor 308;
DD=the fraction bits of dividend 310;
Y=*the scaled divisor; and*
X=the scaled dividend.

In accordance with one embodiment of the present invention, M1 preferably is generated so that the following relationships apply:

$$(0.FFD)_{hex} < DR*M1*r < (1.003)_{hex}; \text{ and}$$

$$(0FFFFE8)_{hex} < Y < (1.000018)_{hex}$$

In accordance with the present invention, the scaled dividend X is the value w[0] used in the iteration unit. However, because quotient-digits q[j+1] are a function of the partial remainder w[j−1] generated two clock cycles earlier, two scaled dividend values are needed; first scaled dividend value w[00] is needed to generate q[1], and second scaled dividend value w[0] is need to generate q[2]. Thus, the following relationships apply:

$$w[00]=DD*M1$$

$$w[0]=X=rw[00]+DD*M2$$

$$q[1]=SEL(r^2 w_{msb}[00])$$

$$q[2]=SEL(r^2 w_{msb}[0], q_{lsb}[1])$$

The configuration and operation of divisor MAC unit 642 and dividend MAC unit 644 are the same. Therefore, only one will be discussed in detail herein. As illustrated in FIG. 6a, divisor MAC unit 642 (and dividend MAC unit 644) comprises a partial product generator ("PPG") 646, a fifth MUX 648, a first carry-save adder 650, a register 652, and a second carry-save adder 654. PPG 646 receives the fraction bits of divisor 308 from second divisor register 634 and scaling sub-factors M1 and M2 from register 630. Six partial products are used in multiplying the divisor (and dividend in dividend MAC unit 644) by sub-scaling factor M1 and five partial products are used in multiplying the divisor (and dividend) by sub-scaling factor M2. As one skilled in the art will appreciate, fifth MUX 648, first carry-save adder 650, register 652 and second carry-save adder 654 are configured to perform the multiplication and addition operations necessary to generate the scaled divisor (and dividend in dividend MAC unit 644). Preferably, the output of divisor MAC unit 642 is the scaled divisor Yin carry-save notation 656, which then passes into a carry-propagate adder 660. Carry-propagate adder 660, transforms the least significant bits of the scaled divisor Y from carry-save notation to a 54 bit single vector value. The output of carry-propagate adder 660 is scaled divisor Y 312, which passes to one of iteration units 304.

The output of dividend MAC unit 644 is scaled dividend X in carry-save notation 658. From dividend MAC unit 644 the scaled dividend X passes into a register 662, which stores scaled dividend X in carry-save form. As illustrated in FIG. 6a, scaled dividend X 314 passes from register 662 to one of iteration units 304 in carry-save notation.

While one particular embodiment of preprocessing unit 302 is illustrated in FIG. 6a and described herein, one skilled in the art will appreciate that other preprocessing unit configurations may be used in accordance with the present invention. In addition, other methods of generating scaling factor M may be used without departing from the spirit of the invention. Therefore, the present invention is not limited to the preprocessing unit described herein.

5. Preprocessing Unit Timing

Referring now to FIG. 7, the timing of the operation of preprocessing unit 302 will be discussed. During clock cycles 1 and 2, divisor DR 308 is loaded into register r_dr 602, and dividend DD 310 is loaded into register r_dd 604. During clock cycles 2 and 3, the fraction bits of divisor DR 308 is moved into first divisor register r_dr1 632. At or near the same time, table values are generated by table select unit 618 and loaded into table register r_tab 620, and scaling sub-factors M1 and M2 are generated and loaded into third MUX 626. During clock cycles 3 and 4, the fraction bits of dividend DD 310 are loaded into second dividend register r_dd2 640, the fraction bits of divisor DR 308 are loaded into second divisor register r_dr2 634, and scaling sub-factors M1 and M2 are loaded into register r_M 630. In addition, values pass to fifth MUX 648 in MAC units 642 and 644. These values are used during clock cycles 4 and 5 to generate scaled divisor Y and scaled dividend X.

During clock cycle 4, divisor MAC unit 642 generates the value DR*M1. During the same clock cycle, dividend MAC unit 644 generates the value w[00]=DD*M1. At clock cycle 5, divisor MAC unit 642 generates scaled divisor Y; where Y=r(DR*M1)+DR*M2. Similarly, dividend MAC unit 644 generates scaled dividend X; where X=w[0]=r(DD*M1)+DD*M2. Also at clock cycle 5, the values w[00] and Y are loaded from preprocessing unit 302 into one of iteration units 304. At clock cycle 6, the value X w[0] is passed to one of iteration units 604.

D. Iteration Unit

1. Iteration Unit Configuration

Figure 8:
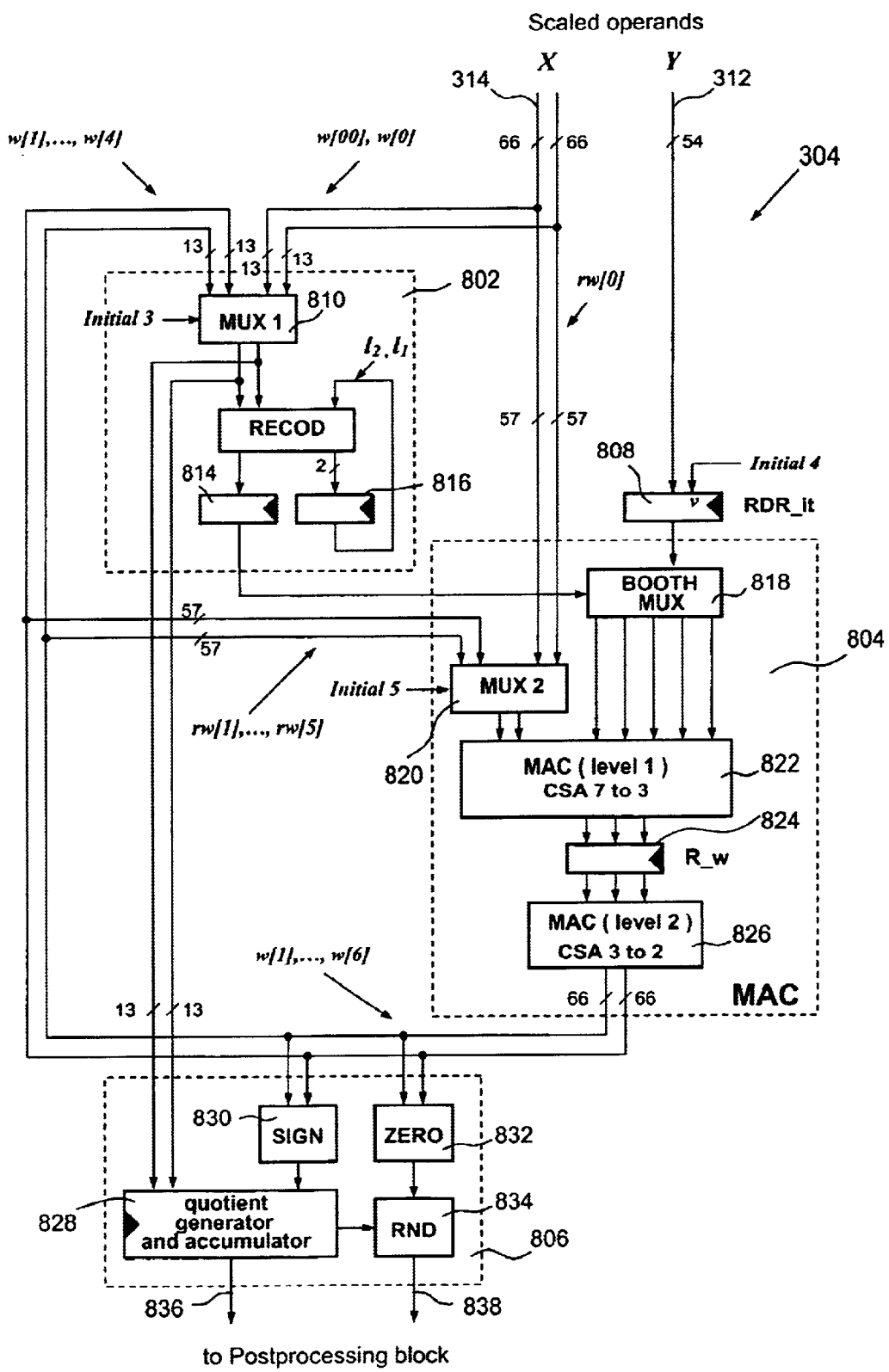
FIG. 8 is a detailed schematic diagram of one embodiment of an iteration unit embodied in the SRT division unit illustrated in FIG. 3.

Referring now to FIG. 8, the configuration and operation of iteration unit 304 will be discussed. Iteration unit 304 comprises a quotient-digit generation unit 802, a MAC unit 804, and a quotient-digit accumulator unit 806. Iteration unit 304 receives scaled divisor Y 312 from preprocessing unit 302 and stores it in a scaled divisor register r_DR_it 808. MAC unit 804 uses the scaled divisor Y 312 to generate partial remainders w[j].

Quotient-digit generation unit 802 comprises a first MUX 810, a recoder unit 812, a quotient register 814 and a bit register 816. First MUX 810 receives scaled dividend values w[00] and w[0], and the partial remainder values w[j−1] and generates quotient-digits from those values according to the formula q[j+1]=SEL(r²w_{msb}[j−1], q[j]). As illustrated in FIG. 8, first MUX 810 receives w[00] and w[0] from preprocessing unit 302, and first MUX 810 receives w[1]–w[4] from MAC unit 804. The combination of first MUX 810 and recoder 812 generates the quotient-digits q[j+1]. Quotient-digit q[j+1] passes from quotient-digit generation unit 802 to quotient-digit generator/accumulator unit 828 in quotient-digit accumulator circuit 806. In addition, quotient-digit q[j+1] passes to recoder 812, which generates correction bits for quotient-digits q[j+1], as well as converts the quotient-digits q[j+1] from carry-save notation to radix 4, booth notation. The quotient-digits q[j+1] in radix 4, booth notation then are stored in quotient register 814. Bit register 816 is used by recoder 812 to generate quotient correction bits. This is discussed in more detail below.

MAC unit 804 comprises a booth MUX 818, a second MUX 820, a first carry-save adder 822, a register 824 and a second carry-save adder 826. As one skilled in the art will appreciate, MAC unit 804 is configured to calculate w[j+1] according to the formula w[j+1]=rw[j]−q[j+1]*Y. To do this, MAC unit 804 receives scaled divisor Y from register 808 and quotient-digit q[j+1] from quotient-digit register 814 into booth MUX 818. In addition, second MUX 820 receives shifted second scaled dividend value rw[0] from preprocessing unit 302, and shifted partial remainders rw[1]–rw[5] from second carry-save adder 826 in MAC unit 804. As one skilled in the art will appreciate, first carry-save adder 822, register 824 and second carry-save adder 826 use the values from second MUX 820 and booth MUX 818 to generate the partial remainder w[j+1]. As discussed above, the partial remainder w[j+1] then is used to calculate quotient-digit q[j+3].

Quotient-digit accumulator circuit 806 comprises a quotient-digit generator/accumulator unit 828, a sign determination unit 830, a zero-digit determination unit 832 and a round unit 834. Quotient-digit generator/accumulator unit 828 receives the quotient-digits q[j] from quotient-digit generator circuit 802 and accumulates the quotient-digits into a final quotient result Q. In addition, sign determination unit 830 receives w[j] from MAC unit 804 and determines its sign. Quotient-digit generator/accumulator unit 828 uses the sign value from sign determination unit 830 to generate the final quotient result Q. In accordance with this aspect of the invention, quotient-digit accumulator/generator unit 828 comprises a quotient-digit accumulator register and two quotient-digit generators; one quotient-digit generator generates q'[j]=q[j] if the sign bit of w[j] is zero, and the other quotient-digit generator generates q"[j]=q[j]−1 if the sign bit of w[j] is one. The following formula applies:

$q\_z[j]=q'[j]=q[j]$ if sign bit=0; and $q\_z[j]=q''[j]=q[j]-1$ if sign bit=1.

The final accumulated quotient Q after N iterations is accumulated in quotient-digit accumulator register according to the following formula:

$$Q = \sum_{j=1}^{N} q\_z[j] * r^{-j}$$

The final quotient Q 836 is passed from quotient-digit generator/accumulator unit 828 along with a rounding bit 838 to post processing unit 306. As discussed above, post processing unit 306 multiplexes the outputs of iteration units 304, and rounds and delivers the division operation result according to IEEE Std. 754.

Round unit 834 generates rounding bit 838 in accordance with IEEE Std. 754. Rounding bit 838 is generated using a sticky bit from zero-digit determination unit 832 and the quotient least significant bit and guard bit from generator/accumulator unit 828. The sticky bit it 1 if the last partial remainder w[6] from MAC unit 804 is not equal to zero. Post processing unit 306 will calculate the final quotient based on the quotient 836 and rounding bit 838 received from iteration unit 304. In addition, post processing unit will combine the final quotient with the new exponent value to generate the final result of the division operation.

2. Iteration Unit Operation and Timing

Referring now to FIG. 9, the timing of the operation of iteration unit 304 will be discussed. As illustrated in FIG. 7, during clock cycle 5, preprocessing unit 302 passes scaled divisor Y and first scaled dividend value w[00] to iteration unit 304. As discussed above, w[00](=DD*M1) is used by quotient-generator unit 302 to generate quotient q[1]. During clock cycle 5, w[00] is loaded into first MUX 810 and quotient-digit q[1] is generated in recoder 812. During clock cycle 6, scaled divisor Y is loaded into divisor register r_DR_it 808, which then feeds MAC unit 804 with the scaled divisor Y. Also during clock cycle 6, iteration unit 304 receives second scaled dividend value X=w[0] 312, which is then loaded into first MUX 810 in quotient-digit generator unit 802. In addition, the value rw[0] is passed to second MUX 820 in MAC unit 804. Quotient-digit q[1] passes from recoder 812 to quotient-digit register 814 and then to MAC unit 804. MAC unit 804 uses q[1] and rw[0] and Y to generate w[1] according to the equation; w[1]=rw[0]−q[1]*Y. At the same time, quotient-digit generator 802 generate quotient-digit q[2] using w[0] from preprocessing unit 302.

During clock cycle 7, w[1] generated in MAC unit 804 during clock cycle 6 passes to quotient-digit generator unit 802, which uses it to generate q[3]. In addition, w[1] is multiplied by r (rw[1]), which then pass back in to MAC unit 804. At the same time q[2] passes for quotient-digit generator unit 802 to MAC unit. MAC unit 804 uses scaled divisor Y, rw[1] and q[2] to generate w[2]; w[2]=rw[1]−q[2]*Y. As illustrated in FIG. 7, this process continues until all quotient-digits q[1]–q[6] and all partial remainders w[1]–w[6] are generated.

In addition to generating quotient-digits q[1]–q[6], the quotient-digits are accumulated in quotient-digit generator/accumulator unit 828 during clock cycles 8—13. At clock cycle 13 the final quotient value Q is output to post processing unit 306. As illustrated in FIG. 7, it takes 9 clock cycles for iteration unit 304 to generate the final quotient value. Also, FIG. 9 shows how iteration unit 304 can overlap processing. At clock cycle 11, iteration unit 304 can receive w[00] and scaled divisor Y for a subsequent division operation.

3. Quotient-digit Generation

Referring now to FIGS. 10a and 10b, a prior art method for generating quotient-digits is illustrated. In particular, FIG. 10a shows a prior art quotient-digit selection function using rounding for a radix=262,144 (k=18) SRT division unit. In the prior art system, a value w[0] 1002 is used to generate the quotient-digits q[1]. As illustrated, value w[0] 1002 is in carry-save form. The 18 most significant bits 1004 of value w[0] 1002 are used as the quotient-digits. In addition, two rounding bits e and f (1014 and 1016) are calculated; one for the carry bits and one for the save bits. To calculate rounding bits e 1014 and 1016, bits a–d (1006–1012) are used according to the following formulas:

$e\ a+c$ $f=bd(\overline{a \oplus c})$

In accordance with the prior art method, the 18 most significant bits 1004 of value w[0] 1002 and rounding bits e and f (1014 and 1016) pass through a booth recoder, which recodes quotient into booth notation form 1018. As illustrated in FIG. 10a, value 1018 comprises 18 bits (k=18), which is twice as large as the quotients of the present invention. As discussed above, the number of quotient-bits determined in one iteration in accordance with the present invention is 9 (k=9). In accordance with one embodiment of the system of the present invention, the speed of a division operation is about the same as the prior art for k=18, but the complexity of the iteration unit in the present invention is significantly less. Also, as one skilled in the art will appreciate, if the prior art system is used, but for radix=512 (k=9), the prior art system will take over twice as long to complete as the system of the present invention.

Referring now to FIGS. 8 and 10*b*, one embodiment of a quotient-digit selection algorithm in accordance with the present invention will be described. In particular, as illustrated in FIG. 8 and as discussed above, partial remainder w[j] is a 66 bit value in carry-save form. However, for radix=512, k=9, only 13 bits of the 66 bit value are loaded into first MUX 810 and used to calculate the quotient-digit q[j+2]. As illustrated in FIG. 10*b*, first scaled dividend value w[00] 1020 is used to obtain the 9 (k=9) quotient-bits for quotient q[1]. Preferably, bits [3:11] 1021 and rounding bits 1030 and 1032 (labeled RdC and RdS in FIG. 10*b*) are used to generate the 9 quotient-bits. As one skilled in the art will appreciate, any suitable method for generating rounding bits 1030, 1032 may be used; for example, the method described above with reference to FIG. 10*a* may be used to generate the rounding bits. That particular method of generating rounding bits is described in greater detail in MILOŠ D. ERCEGOVAC AND TOMÁS LANG, DIVISION AND SQUARE ROOT: DIGIT-RECURRENCE ALGORITHMS AND IMPLEMENTATIONS (1994), which is incorporated herein by reference for all purposes. In the embodiment described in MILOŠ D. ERCEGOVAC AND TOMÁS LANG, DIVISION AND SQUARE ROOT: DIGIT-RECURRENCE ALGORITHMS AND IMPLEMENTATIONS, a rounding constant of 1 is used to generate the rounding bits. However, in accordance with an alternative embodiment of the present invention, other rounding constants can be used, such as ½, ⅝, or any other suitable rounding constant. Moreover, any other suitable rounding bit generation algorithm may be used with the present invention. Thus, the present invention is not limited to the embodiments disclosed herein.

In addition, the least significant bits 12, 11 (1036, 1038) of the quotient q[1] 1034 preferably are generated using the least significant bits of bits[3:11] and rounding bits 1030, 1032. In accordance with this aspect of the present invention, a recoder, for example recoder 812 in FIG. 8, uses the two least significant bits of bit [3:11] 1022–1028 (labeled LC1, LC2, LS1 and LS2 in FIG. 10*b*) and rounding bits 1030 and 1032 to generate bits 12 and 11 1036, 1038 of q[1]. Preferably, bits 12 and 11 (1036, 1038) are generated in single vector form.

In FIG. 10*b*, quotient-digit q[1] is illustrated as a stored single vector value 1034 comprising 9 bits. This is because quotient-digit q[1] was obtained from a previous iteration. Quotient-digit q[2] is shown in carry-save form.

To generate quotient-digit q[2], second scaled dividend value w[0] is used. As illustrated in FIG. 10*b*, quotient-digit q[2] is generated from bits [3:11] 1050 of w[0], and rounding bits 1052 and 1054. Because a simplified method of rounding is used in accordance with the present invention, an error correction algorithm is implemented to offset any errors that may occur from the rounding. The error correction algorithm uses the least significant bits 12 and 11 (1036 and 1038) of stored q[1] 1034 and extra bits e2 and e1 (1046, 1048) determined from bits [1:2] of w[0] to obtain correction bit(s) c 1056 for quotient q[2]). The value of correction bit(s) c 1056 is determined according to table 1060 in FIG. 10*b*. After the correction bits have been determined, the correction bits, quotient-digit and round bits for q[2] are recoded into radix 4, booth notation form. A radix 4 recoder, which may be part of recoder 812 is used to recode the quotient-digit into radix 4, booth notation.

The same quotient-digit generation and correction function is used for quotient-digits q[3]31 [6]. For example, partial remainder value w[1] and quotient-digit q[2] are used to generate quotient-digit q[3], partial remainder value w[2] and quotient-digit q[3] are used to generate quotient-digit q[4], etc. As discussed above with reference to FIG. 8, after quotient-digits q[1]–q[6] are generated, they are accumulated into a single final quotient Q by quotient accumulator unit 806.

While a novel method of generating quotient-digits is disclosed herein, one skilled in the art will appreciate that other methods of generating quotient-digits may be used in accordance with the present invention. For example, other quotient-digit selection methods, such as the prior art rounding method illustrated in FIG. 10*a*, quotient-digit selection by truncation methods, and/or other rounding methods may be used. Therefore, the present invention is not limited to the quotient-digit selection methods disclosed herein.

E. Conclusion

In conclusion, the present invention provides a novel SRT division unit and SRT division algorithm, which performs high-radix SRT division at high speeds, but with a smaller, more simplified hardware architecture. While a detailed description of presently preferred embodiments of the invention has been given above, various alternatives, modifications, and equivalents will be apparent to those skilled in the art. For example, while the SRT division unit and SRT division algorithm are disclosed herein with reference to a particular processor architecture, one skilled in the art will appreciate that the division unit and algorithm of the present invention can be used with any processor architecture. Also, while the division unit and algorithm are disclosed herein as performing high-radix division with a radix of 512, one skilled in the art will appreciate that the algorithm disclosed herein can be used for any radix value. Therefore, the above description should not be taken as limiting the scope of the invention, which is defined by the appended claims.

What is claimed is:

1. In a processor having an SRT division unit comprising a pre-processing portion, an iteration portion, and a post processing portion, the SRT division unit configured to process a method of performing high radix division with double pre-scaling of a dividend, wherein 'n' is the total number of quotient-bits to be generated, 'k' is the number of quotient-bits generated during a single iteration, and N is the number of iterations needed to determine all quotient-bits n, such that the relationship N=n/k applies, and wherein a radix r=$2^k$, the method comprising the steps of:

the SRT division unit receiving a divisor value DR and a dividend value DD from a storage location;

generating a scaled divisor Y from the divisor value DR;

generating a first scaled dividend value w[00] by performing a first pre-scaling operation on the dividend DD;

generating a second scaled dividend value w[0] by performing a second pre-scaling operation on said dividend DD; and performing a first iteration, comprising the steps of:
generating a first quotient-digit q[1] using said first scaled dividend value w[00];
generating a partial remainder value w[1] using said first quotient-digit q[1], said scaled divisor Y and a shifted second scaled dividend r*w[0];

performing a second iteration, comprising the steps of:
  generating a second quotient-digit q[2] using said second scaled dividend value w[0] and at least one bit from said first quotient-digit q[1];
  generating a partial remainder value w[2] using said quotient-digit q[2], said scaled divisor Y and a shifted partial remainder r*w[1];
performing subsequent iterations j, wherein j=3 to N, said subsequent iterations comprising the steps of;
  generating a quotient-digit q[j] for iteration j using a partial remainder value w[j−2] from iteration j−2 and at least one bit from said quotient-digit q[j−1] from iteration j−1;
  generating a partial remainder value w[j] using said quotient-digit q[j], said scaled divisor Y and a shifted partial remainder r*w[j−1];
accumulating quotient-digits q[1] to q[N] into final quotient value.

2. The method as recited in claim 1, further comprising the steps of:
  generating a result exponent value by subtracting an exponent value of the divisor value DR from an exponent value of the dividend value DD, and
  combining the result exponent value with the final quotient value to generate a final division result generated and output by the SRT division unit.

3. The method as recited in claim 2, further comprising the step of:
  generating at least one rounding bit using said partial remainder value w[N] and said quotient-digit q[N], and rounding said final quotient value using said at least one rounding bit in accordance with IEEE standard 754.

4. The method as recited in claim 1, wherein the step of generating quotient-digit q[1] is performed substantially concurrently with the step of generating said second scaled dividend value w[0], and wherein the iterations overlap, such that for iteration j (j=1 to N), the step of generating quotient-digit q[j] is performed substantially concurrently with the step of generating partial remainder value w[j−1].

5. The method as recited in claim 1, wherein for iteration j=1 to N) quotient-digit q[j] is generated before partial remainder w[j−1.

6. The method as recited in claim 1, wherein for iteration j (j=1 to N), and said partial remainder value w[j]=r*w[j−1]−q[j]*Y.

7. The method as recited in claim 1, further comprising the step of generating a scaling factor M, which comprises scaling sub-factors M1 and M2 according to the relationship M=(r*M1)+M2.

8. The method as recited in claim 7, wherein said step of generating a scaled divisor Y comprises multiplying a divisor DR by said scaling factor M, such that said pre-scaled divisor Y=DR*M=r(DR*M1)+DR*M2.

9. The method as recited in claim 7, wherein said step of generating a first scaled dividend value w[00] comprises multiplying a dividend DD by said scaling sub-factor M1, such that said first scaled dividend value w[00]=DD*M1.

10. The method as recited in claim 7, wherein said step of generating a second scaled dividend value w[0] comprises multiplying a dividend DD by said scaling factor M, such that said second scaled dividend value w[0]=DD*M=r(DD*M1)+DD*M2.

11. The method as recited in claim 7, wherein scaling sub-factors M1 and M2 are generated by a method comprising the steps of:
  obtaining some of the most significant bits of a fraction portion of a divisor DR ($DR_{msb}$);
  selecting some of the least significant bits of $DR_{msb}$ (DR_1);
  obtaining a first table look-up value T1, a second table look-up value T2, and a third table look-up value T3, using bits from $DR_{msb}$;
  generating scaling sub-factor M1 using some of the most significant bits of first table look-up value T1, some of the most significant bits of second table look-up value T2, and some of the most significant bits of DR_1; and
  generating scaling sub-factor M2 using second table look-up value T2, third table look-up value T3; DR_1, and bits from first table look-up value T1.

12. The method as recited in claim 11, wherein for radix r=512, k=9, and N=6:
  $DR_{msb}$ comprises the 20 most significant bits of the fraction portion of divisor DR ($DR_{msb}$), $DR_{msb}$ comprising 5 sets of 4 bits, $DR_{msb(0-3)}$, $DR_{msb(4-7)}$, $DR_{msb(8-11)}$, $DR_{msb(12-15)}$, $DR_{msb(16-19)}$, wherein $DR_{msb(0-3)}$ comprises the 4 least signficant bits of $DR_{msb}$ and $DR_{msb(16-19)}$ comprises the 4 most significant bits of $DR_{msb}$;
  the step of obtaining a first table look-up value T1 comprises the step of obtaining a 25 bit value from a table using the 8 most significant bits of $DR_{msb}$ ($DR_{msb(16-19)}$ and $DR_{msb(12-15)}$);
  the step of obtaining a second table look-up value T2 comprises the step of obtaining a 16 bit value from a table using the 8 most significant bits of $DR_{msb}$ ($DR_{msb(16-19)}$ and $DR_{msb(12-15)}$);
  the step of obtaining a third table look-up value T3 comprises the step of obtaining a 7 bit value using said bits $DR_{msb(16-19)}$ and $DR_{msb(8-11)}$;
  the step of generating scaling sub-factor M1 comprises using said bits $DR_{msb(8-11)}$, the 14 most significant bits of T1 ($T1_{14msb}$) and the 5 most significant bits of T2 ($T2_{5msb}$), according to the formula $M1=T1_{14msb}+T2_{5msb}*DR_{20msb(8-11)}$; and
  the step of generating scaling sub-factor M2 comprises using the 12 least significant bits of $DR_{msb}$ ($DR_{msb(8-11)}$, $DR_{msb(4-7)}$, and $DR_{msb(0-3)}=DR_{msb(12lsb)}$), the 16 least significant bits of T1 ($T1_{16lsb}$), all 16 bits of T2, and all 7 bits of T3, according to the formula $M2=T1_{16lsb}+T2*DR_{20msb(12lsb)}+T3$.

13. The method as recited in claim 12, wherein scaling sub-factors M1 and M2 are generated in carry-save notation.

14. The method as recited in claim 12, further comprising the steps of:
  obtaining the 2 least significant bits (l2 and l1) of M1;
  obtaining the 2 most significant bits (e2 and e1) of M2;
  calculating correction bits c using l2, l1, e2, and e1 in accordance with the formula c=(e2, e1)−(l2, l1)=(0, −1, −2); and
  setting the 2 most significant bits of M2 to correction bit c.

15. The method as recited in claim 1, wherein the iteration portion comprises one or more iteration units adapted to perform the iterations.

16. In a processor having an SRT division unit comprising a pre-processing portion, an iteration portion, and a post processing portion, the SRT division unit configured to process a method for performing high radix division with double pre-scaling of a dividend, wherein 'n' is the total number of quotient-bits to be generated, 'k' is the number of quotient-bits generated during a single iteration, and N is the number of iterations need to determine all quotient-bits n, such that the relationship N=n/k applies, and wherein said a radix $r=2^k$, the method comprising the steps of:

the SRT division unit receiving a divisor value DR and a dividend value DD from a storage location;

generating a scaling factor M, which comprises scaling sub-factors M1 and M2 according to the relationship M=(r*M1)+M2, wherein r is a division radix;

generating a scaled divisor Y by multiplying the divisor value DR by scaling factor M, such that said scaled divisor Y=DR*M=r(DR*M1)+DR*M2;

generating a first scaled dividend value w[00], by muliplying the dividend value DD by scaling sub-factor M1, such that said first scaled dividend value w[00]= DD*M1;

generating a second scaled dividend value w[0] by multiplying the dividend value DD by scaling factor M, such that said second scaled dividend value w[0]= DD*M=r(DD*M1)+DD*M2;

performing a first iteration, comprising the steps of;
  generating a first quotient-digit q[1] using said first scaled dividend value w[00];
  generating a partial remainder value w[1] using said first quotient-digit q[1], said scaled divisor Y and a shifted second scaled dividend r*w[0], wherein said shifted second scaled dividend r*w[0] comprises said second scaled dividend value w[0] multiplied by said radix r, said partial remainder value w[1]=r*w[0]-q[1]*Y;

performing a second iteration comprising the steps of;
  generating a second quotient-digit q[2] using said second scaled dividend value w[0] and at least one bit from said first quotient-digit q[1];
  generating a partial remainder value w[2] using said second quotient-digit q[2], said scaled divisor Y and a shifted partial remainder r*w[1], wherein said shifted partial remainder r*w[1] comprises said partial remainder w[1] multiplied by said radix r, said partial remainder value w[2]=r*w[1]-q[2]*Y;

performing subsequent iterations j, wherein j=3 to N, said subsequent iterations comprising the steps of,
  generating a quotient-digit q[j] for iteration j using a partial remainder value w[j-2] from iteration j-2 and at least one bit from a quotient-digit q[j-1] from iteration j-1;

generating a partial remainder value w[j] using said quotient-digit q[j], said scaled divisor Y and a shifted partial remainder r*w[j-1], wherein said shifted partial remainder r*w[j-1] comprises said partial remainder w[j-1] multiplied by said radix r, said partial remainder value w[j]=r*w[j-1]-q[j]*Y; and accumulating quotient-digits q[1] to q[N] into final quotient value.

17. The method as recited in claim 16, further comprising the step of:

generating a result exponent value by subtracting an exponent value of the divisor value DR from an exponent value of the dividend value DD; and combining the result exponent value with the final quotient value to generate a final division result generated and output by the SRT division unit.

18. The method as recited in claim 16, further comprising the step of:

generating at least one rounding bit using said partial remainder value w[N] and said quotient-digit q[N], and rounding said final quotient value using said at least one rounding bit in accordance with IEEE standard 754.

19. The method as recited in claim 16 wherein the step of generating quotient-digit q[1] is performed substantially concurrently with the step of generating said second scaled dividend value w[0], and wherein the iterations overlap, such that for j=2 to N, the step of generating quotient-digit q[j] is performed substantially concurrently with the step of generating partial remainder value w[j-1].

20. The method as recited in claim 19, wherein for iteration j (j=1to N) quotient-digit q[j] is generated before partial remainder w[j-1].

21. The method as recited in claim 16, wherein scaling sub-factors M1 and M2 are generated by a method comprising the steps of:

obtaining some of the most significant bits of a fraction portion of a divisor DR ($DR_{msb}$);

selecting some of the least significant bits of $DR_{msb}$ (DR_1);

obtaining a first table look-up value T1, a second table look-up value T2, and a third table look-up value T3, using bits from $DR_{msb}$;

generating scaling sub-factor M1 using some of the most significant bits of first table look-up value T1, some of the most significant bits of second table look-up value T2, and some of the most significant bits of DR_1; and generating scaling sub-factor M2 using second table look-up value T2, third table look-up value T3, DR_1, and bits from first table look-up value T1.

22. The method as recited in claim 21, wherein for radix r=512, k=9, and N=6:

$DR_{msb}$ comprises the 20 most significant bits of the fraction portion of divisor DR ($DR_{msb}$), $DR_{msb}$ comprising 5 sets of 4 bits, $DR_{msb(0-3)}$, $DR_{msb(4-7)}$, $DR_{msb(8-11)}$, $DR_{msb(12-15)}$, $DR_{msb(6-19)}$, wherein $DR_{msb(0-3)}$ comprises the 4 least signficant bits of $DR_{msb}$ and $DR_{msb(6-19)}$ comprises the 4 most significant bits of $DR_{msb}$;

the step of obtaining a first table look-up value T1 comprises the step of obtaining a 25 bit value from a table using the 8 most significant bits of $DR_{msb}$ ($DR_{msb(16-19)}$ and $DR_{msb(12-15)}$);

the step of obtaining a second table look-up value T2 comprises the step of obtaining a 16 bit value from a table using the 8 most significant bits of $DR_{msb}$ ($DR_{msb(16-19)}$ and $DR_{msb(12-15)}$);

the step of obtaining a third table look-up value T3 comprises the step of obtaining a 7 bit value using said bits $DR_{msb(16-19)}$ and $DR_{msb(8-11)}$;

the step of generating scaling sub-factor M1 comprises using said bits $DR_{msb(8-11)}$, the 14 most significant bits of T1 ($T1_{14msb}$) and the 5 most significant bits of T2 ($T2_{5msb}$), according to the formula $M1=T1_{14msb}+T2_{5msb}*DR_{20msb(8-11)}$; and the step of generating scaling sub-factor M2 comprises using the 12 least significant bits of $DR_{msb}$ ($DR_{msb(8-11)}$, $DR_{msb(4-7)}$, and $DR_{msb(0-3)}=DR_{msb(12lsb)}$), the 16 least significant bits of T1 ($T1_{16lsb}$), all 16 bits of T2, and all 7 bits of T3, according to the formula $M2=T1_{16lsb}+T2*DR_{20msb(12lsb)}+T3$.

23. The method as recited in claim 21, wherein scaling sub-factors M1 and M2 are generated in carry-save notation.

24. The method as recited in claim 21, further comprising the steps of:

obtaining the 2 least significant bits (l2 and l1) of M1;
obtaining the 2 most significant bits (e2 and e1) of M2;
calculating correction bits c using l2, l1, e2, and e1 in accordance with the formula c=(e2, e1)−(l2, l1)=(0, −1, −2); and
setting the 2 most significant bits of M2 to correction bit c.

25. The method as recited in claim 16, wherein the iteration portion comprises one or more iteration units adapted to perform the iterations.

26. In a processor for performing a division operation that utilizes pre-scaling prior to generating quotient-digits, the processor comprising an SRT division unit having a pre-processing portion for performing the pre-scaling, the pre-processing portion configured to perform a method of generating a scaling factor M, which comprises scaling sub-factors M1 and M2 according to the relationship M=(r*M1)+M2, the method comprising the steps of:

obtaining some of the most significant bits of a fraction portion of a divisor DR ($DR_{msb}$);

selecting some of the least significant bits of $DR_{msb}$ (DR_1);

obtaining a first table look-up value T1, a second table look-up value T2, and a third table look-up value T3, using bits from $DR_{msb}$;

generating scaling sub-factor M1 using some of the most significant bits of first table look-up value T1, some of the most significant bits of second table look-up value T2, and some of the most significant bits of DR_1; and generating scaling sub-factor M2 using second table look-up value T2, third table look-up value T3, DR_1, and bits from first table look-up value T1.

27. The method as recited in claim 26, wherein for radix r=512, k=9, and N=6:

$DR_{msb}$ comprises the 20 most significant bits of the fraction portion of divisor DR ($DR_{msb}$), $DR_{msb}$ comprising 5 sets of 4 bits, $DR_{msb(0-3)}$, $DR_{msb(4-7)}$, $DR_{msb(8-11)}$, $DR_{msb(12-15)}$, $DR_{msb(6-19)}$, wherein $DR_{msb(0-3)}$ comprises the 4 least signficant bits of $DR_{msb}$ and $DR_{msb(16-19)}$ comprises the 4 most significant bits of $DR_{msb}$;

the step of obtaining a first table look-up value T1 comprises the step of obtaining a 25 bit value from a table using the 8 most significant bits of $DR_{msb}$ ($DR_{msb(16-19)}$ and $DR_{msb(12-15)}$);

the step of obtaining a second table look-up value T2 comprises the step of obtaining a 16 bit value from a table using the 8 most significant bits of $DR_{msb}$ ($DR_{msb(16-19)}$ and $DR_{msb(12-15)}$);

the step of obtaining a third table look-up value T3 comprises the step of obtaining a 7 bit value using said bits $DR_{msb(6-19)}$ and $DR_{msb(8-11)}$;

the step of generating scaling sub-factor M1 comprises using said bits $DR_{msb(8-11)}$, the 14 most significant bits of T1 ($T1_{14msb}$) and the 5 most significant bits of T2 ($T2_{5msb}$), according to the formula $M1=T1_{14msb}+T2_{5msb}*DR_{20msb(8-11)}$; and the step of generating scaling sub-factor M2 comprises using the 12 least significant bits of $DR_{msb}$ ($DR_{msb(8-11)}$, $DR_{msb(4-7)}$, and $DR_{msb(0-3)}=DR_{msb(12lsb)}$), the 16 least significant bits of T1 ($T1_{16lsb}$), all 16 bits of T2, and all 7 bits of T3, according to the formula $M2=T1_{16lsb}+T2*DR_{20msb(12lsb)}+T3$.

28. The method as recited in claim 26, wherein scaling sub-factors M1 and M2 are generated in carry-save notation.

29. The method as recited in claim 26, further comprising the steps of:

obtaining the 2 least significant bits (l2 and l1) of M1;
obtaining the 2 most significant bits (e2 and e1)of M2;
calculating correction bits c using l2, and l1, e2, and e1 in accordance with the formula c=(e2, e1)−(l2, and l1)=(0, −1, −2); and
setting the 2 most significant bits of M2 to correction bits c.

30. A pipelined division unit for performing one or more division operations, comprising:

a pre-processing unit for generating a scaling factor M, and for using said scaling factor M to generate a scaled divisor Y, a first scaled dividend value w[00] and a second scaled dividend value w[0] for each of said division operation;

a plurality of iteration units, each of said iteration units for generating N quotient-digits with a radix r for a division operation, and for combining said N quotient-digits into a quotient result Q;

a post processing unit for generating a division result for each of said division operations by:
generating a final quotient value by rounding said quotient result Q; and
combining said final quotient value with a result exponent value;

a second one of said plurality of iteration units being configured to begin performing iterations for a second division operation while a first one of said plurality of iteration units is performing iterations for a first division operation.

31. The pipelined division unit as recited in claim 30, wherein said pipelined division unit performs floating-point division in accordance with IEEE standard 754.

32. The pipelined division unit as recited in claim 31, wherein said pre-processing unit performs double pre-scaling on a dividend DD.

33. The pipelined division unit as recited in claim 30, wherein said pre-processing unit further comprises:

a first register for holding a divisor DR in floating-point form, said divisor DR comprising a fraction value and an exponent value;

a second register for holding a dividend value DD in floating point form, said dividend value DD comprising a fraction value and an exponent value;

an exponent unit for calculating said result exponent value by subtracting the exponent value of divisor DR from the exponent value of dividend DD;

a scaling factor generation unit for generating said scaling factor M;

a divisor pre-scaling unit for scaling divisor DR using scaling factor M, generating a scaled divisor Y; and a dividend pre-scaling unit for scaling dividend DD using scaling factor M, generating said first scaled dividend value w[00] and said second scaled dividend value w[0].

34. The pipelined division unit as recited in claim 33, wherein said pre-processing unit further comprises a normalization unit for normalizing the fraction value of divisor DR and the fraction value of dividend DD if the fraction value of divisor DR or the fraction value of dividend DD are not in normal form.

35. The pipelined division unit as recited in claim 33, wherein said pre-processing unit further comprises a compare unit and a shift unit, said compare unit for comparing the fraction value of divisor DR with the fraction value of dividend DD, and said shift unit for left shifting the bits of the fraction value of dividend DD one bit if the fraction value of dividend DD is less than the fraction value of divisor DR.

36. The pipelined division unit as recited in claim 33, wherein said pre-processing unit further comprises a carry-propagate adder, which receives said scaled divisor Y from said divisor pre-scaling unit in carry-save notation and transforms at least a portion of the scaled divisor Y from carry-save notation into a single vector value.

37. The pipelined division unit as recited in claim 33, wherein said scaling factor generation unit comprises:
   a table select unit for generating one or more table values;
   a first scaling sub-factor generation unit configured to receive at least one of said one or more table values from said table select unit and bits from the fraction value of said divisor DR to generate a first scaling sub-factor M1; and
   a second scaling sub-factor generation unit configured to receive at least one of said one or more table values from said table select unit and bits from the fraction value of said divisor DR to generate a second scaling sub-factor M2.

38. The pipelined division unit as recited in claim 37, wherein scaling factor generation unit further comprises a booth recoder unit for re-coding scaling sub-factors M1 and M2 from carry-save notation to radix-4 booth notation.

39. The pipelined division unit as recited in claim 37, wherein for a radix $r=2^k=512$ (k=9):
   said scaling factor generation unit is configured to receive the 20 most significant bits of the fraction bits of divisor DR ($DR_{20msb}$), $DR_{20msb}$ comprising 5 sets of 4 bits, $DR_{20msb(0-3)}$, $DR_{20msb(4-7)}$, $DR_{20msb(8-11)}$, $DR_{20msb(12-15)}$, $DR_{20msb(16-19)}$, wherein $DR_{20msb(0-3)}$ comprises the 4 least signficant bits of $DR_{20msb}$ and $DR_{20msb(16-19)}$ comprises the 4 most significant bits of $DR_{20msb}$;
   said table select unit is configured to generate;
      (1) a first table look-up value T1 from a table using the 8 most significant bits of $DR_{20msb}$ ($DR_{20msb(16-19)}$ and $DR_{20msb(12-15)}$), said first table look-up value T1 being 25 bits;
      (2) a second table look-up value T2 from a table using the 8 most significant bits of $DR_{20msb}$ ($DR_{20msb(16-19)}$ and $DR_{20msb(12-15)}$), said second table look-up value T2 being 16 bits; and
      (3) a third table look-up value T3 using said bits $DR_{20msb(16-19)}$ and $DR_{20msb(8-11)}$, said third table look-up value T3 being 7 bits;
   said first scaling sub-factor generation unit is configured to generate a scaling sub-factor M1 using said bits $DR_{20msb(8-11)}$, the 14 most significant bits of T1 ($T1_{14msb}$) and the 5 most significant bits of T2 ($T2_{5msb}$), according to the formula $M1=T1_{14msb}+T2_{5msb}*DR_{20msb}(8-11)$; and
   said second scaling sub-factor generation unit is configured to generate a scaling sub-factor M2 using the 12 least significant bits of $DR_{20msb}$ ($DR_{20msb(8-11)}$, $DR_{20msb(4-7)}$, and $DR_{20msb(0-3)}=DR_{20msb(12lsb)}$), the 16 least significant bits of T1 ($T1_{16lsb}$), all 16 bits of T2 and all 7 bits of T3, according to the formula $M2=T1_{16lsb}+T2*DR_{20msb(12lsb)}+T3$.

40. The pipelined division unit as recited in claim 39, wherein scaling sub-factors M1 and M2 are generated in carry-save notation.

41. The pipelined division unit as recited in claim 39, wherein said scaling factor generation unit further comprises a mulitplexer, and a booth recoder unit, and wherein said scaling factor generation unit is configured to generate correction bits c for scaling sub-factor M2 in accordance with the method comprising the steps of:
   said multiplexer receiving from first and second scaling sub-factor generation units scaling sub-factors M1 and M2, respectively;
   said booth recoder first receiving scaling sub-factor M1 from said mulitplexer and re-coding sub-factor M1 from carry-save notation to radix-4 booth notation;
   storing sub-factor M1 in radix-4 booth notation;
   said booth recoder then receiving scaling sub-factor M2 from said muliplexer in carry-save notation;
   obtaining the 2 least significant bits (l2 and l1) of M1;
   obtaining the 2 most significant bits (e2 and e1) of M2;
   calculating correction bits c using l2, and l1, e2, and e1 in accordance with the formula c=(e2, e1)−(l2, and l1)=(0, −1, −2); and
   setting the 2 most significant bits of M2 to correction bits c.

42. The pipelined division unit as recited in claim 37, wherein said first and said second scaling sub-factor generation units generate scaling sub-factors M1 and M2 using a linear interpolation method.

43. The pipelined division unit as recited in claim 33, wherein said divisor pre-scaling unit comprises a partial product generator (PPG), a multiplexer, a first carry-save adder, and a second carry-save adder, and wherein said divisor pre-scaling unit scales said divisor by:
   said PPG receiving the fraction value of said divisor DR from said first register holding the fraction value of said divisor DR, and receiving said scaling sub-factors M1 and M2 from said scaling factor generation unit;
   said PPG, said first carry-save adder, said second carry-save adder, and said multiplexer generating partial products and performing multiplication and addition operations with the fraction value of said divisor DR and said scaling sub-factors M1 and M2, generating a scaled divisor Y.

44. The pipelined division unit as recited in claim 43, wherein said scaled divisor Y is in carry-save notation, and wherein said pre-processing unit further comprises a carry-propagate adder, which converts a least a portion of scaled divisor Y from carry-save notation to a single vector value.

45. The pipelined division unit as recited in claim 43, wherein said pre-processing unit further comprises a divisor multiplexer and a normalization unit;
   said normalization unit for normalizing said divisor DR if said divisor DR is not in normal form; and
   said divisor muliplexer configured to receive said divisor DR from said first register and/or receive a normalized divisor from said normalization unit, and pass said divisor DR from said first register to said PPG if said divisor DR does not need normalization, or pass said normalized divisor to said PPG if said divisor DR does need normalization.

46. The pipelined division unit as recited in claim 43, wherein said divisor pre-scaling unit generates said scaled divisor Y according to the formula $Y=DR*M=r(DR*M1)+DR*M2$, and wherein scaling sub-factors M1 and M2 are generated such that the value of scaled divisor Y is close to 1.

47. The pipelined division unit as recited in claim 33, wherein said dividend pre-scaling unit comprises a partial product generator (PPG), a multiplexer, a first carry-save adder, and a second carry-save adder, and wherein said dividend pre-scaling unit scales said dividend by:

said PPG receiving the fraction value of said dividend DD from said second register holding the fraction value of said dividend DD, and receiving said scaling sub-factors M1 and M2 from said scaling factor generation unit;

said PPG, said first carry-save adder, said second carry-save adder, and said multiplexer generating partial products and performing multiplication and addition operations with the fraction value of said dividend DD and said scaling sub-factors M1 and M2, generating a first partial remainder w[00] and a second partial remainder w[0].

48. The pipelined division unit as recited in claim 47, wherein said pre-processing unit further comprises a dividend multiplexer and a normalization unit;

said normalization unit for normalizing said dividend DD if said dividend DD is not in normal form; and said dividend muliplexer configured to receive said dividend DD from said second register and/or receive a normalized dividend from said normalization unit, and pass said dividend DD from said second register to said PPG if said normalization unit does not normalize said dividend DD, or pass said normalized dividend to said PPG if said normalization unit does normalize said dividend DD.

49. The pipelined division unit as recited in claim 47, wherein said dividend pre-scaling unit generates said first scaled dividend value w[00] according to the formula w[00]=DD*M1, and wherein said dividend pre-scaling unit generates said second scaled dividend value w[0] according to the formula w[0]=DD*M=r(DD*M1)+DD*M2.

50. The pipelined division unit as recited in claim 49, wherein one of said plurality of iteration units generates a first quotient-digit q[1] using said first scaled dividend value w[00] and a second quotient-digit q[2] using said second scaled dividend value w[0].

51. The pipelined division unit as recited in claim 30, wherein each of said plurality of iteration units performs a plurality of iterations to generate a plurality of quotient-digits, and wherein each of said plurality of iterations is performed in two short clock cycles and said plurality of iterations overlap, such that a first iteration is performed during a first clock cycle and a second clock cycle, and a second iteration is performed during said second clock cycle and a third clock cycle.

52. The pipelined division unit as recited in claim 30, wherein each of said plurality of iteration units comprises a quotient-digit generation unit, a multiply-accumulate (MAC) unit, and a quotient-digit accumulator unit, and wherein each of said plurality of iteration units receives a scaled divisor Y, a first scaled dividend value w[00], and a second scaled dividend value w[0] from said pre-processing unit and performs division iterations using said scaled divisor Y, said first scaled dividend value w[00], and said second scaled dividend value w[0].

53. The pipelined division unit as recited in claim 52, wherein 'n' is the total number of quotient-digits to be generated, 'k' is the number of quotient-bits generated in a single iteration, and N is the number of iterations needed to determine all quotient-bits n, such that the relationship N=n/k applies and a radix $r=2^k$, and wherein said iteration unit generates quotient-digits by performing a method comprising the steps of:

performing a first iteration by:

said quotient-digit generation unit receiving said first scaled dividend value w[00] from said pre-processing unit and generating a first quotient-digit q[1] according to the formula q[1]=SEL($r^2w_{msb}$[00]); and said MAC unit receiving said scaled divisor Y and a shifted second dividend value r*w[0] from pre-processing unit, and first quotient-digit q[1] from said quotient-digit generation unit, and said MAC unit generating a partial remainder w[1] according to the formula w[1]=r*w[0]−q[1]*Y;

performing a second iteration by:

said quotient-digit generation unit receiving said second scaled dividend value w[0] from said pre-processing unit, and generating a second quotient-digit q[2] according to the formula q[2]=SEL($r^2w_{msb}$[0], q[1]) during the same clock cycle that said MAC unit is generating partial remainder w[1]; and said MAC unit receiving a shifted partial remainder value r*w[1] from an output of said MAC unit, and second quotient-digit q[2] from said quotient-digit generation unit, and said MAC unit generating a partial remainder w[2] according to the formula w[2]=r*w[1]−q[2]*Y;

performing subsequent iterations j, wherein j=3 to N, said subsequent iterations comprising the steps of:

said quotient-digit generation unit;

receiving said partial remainder value w[j−2] from said MAC unit, said partial remainder value w[j−2] being generated by said MAC unit during iteration j−2; and using said partial remainder value w[j−2] and quotient-digit q[j−1] generated during iteration j−1, generating a quotient-digit q[j] according to the formula q[j]=SEL($r^2w_{msb}$[j−2], q[j−1]) during the same clock cycle that said MAC unit is generating partial remainder w[j−1]; and during the next clock cycle, said MAC unit receiving a shifted partial remainder value r*w[j−1] from said output of said MAC unit, and receiving quotient-digit q[j] from said quotient-digit generation unit, and said MAC unit generating a partial remainder w[j] according to the formula w[j]=r*w[j−1]−q[j]*Y.

54. The pipelined division unit as recited in claim 53, wherein said quotient-digit :generation unit further comprises a recoder unit and a quotient-digit register, said quotient-digit generation unit generating quotient-digits q[j] (j=1 to N) by performing a quotient-digit selection by rounding method, said method comprising the steps of:

generating first quotient-digit q[1] by:

said quotient-digit generation unit receiving said first scaled dividend value w[00] from said pre-processing unit, said first scaled dividend value w[00] being in carry-save notation, wherein said carry portion comprises 66 bits and said sum portion comprises 66 bits;

selecting the k+2 most significant bits of the carry portion and the k+2 most significant bits of the sum portion of said first scaled dividend value w[00], bit 1 being the most significant bit of the k+2 most significant bits and bit k+2 being the least significant bit of the k+2 most significant bits;

generating rounding bits;

selecting the k least significant bits of the k+2 most significant bits of said carry portion and the k least significant bits of the k+2 most significant bits of said sum portion of said first scaled dividend value w[00];

generating said first quotient-digit q[1] in carry-save form as a sum of said k least significant bits of the k+2 most significant bits of said carry portion, said k least significant bits of the k+2 most significant bits of said sum portion, and said rounding bits;

generating 2 least significant bits l2 and l1 of said first quotient-digit q[1] in single vector form;

storing said 2 least significant bits l2 and l1 of said first quotient-digit q[1];

re-coding said first quotient-digit q[1] from carry-save notation into radix-4 booth notation, generating said quotient-digit q[1] in radix-4 booth notation; and storing said quotient-digit q[1] in radix-4 booth notation in said quotient-digit register;

generating second quotient-digit q[2] by:

said quotient-digit generation unit receiving said second scaled dividend value w[0] from said pre-processing unit, said second scaled dividend value w[0] being in carry-save notation, wherein said carry portion comprises 66 bits and said sum portion comprises 66 bits;

selecting the k+2 most significant bits of the carry portion and the k+2 most significant bits of the sum portion of said second scaled dividend value w[0], bit 1 being the most significant bit of the k+2 most significant bits and bit k+2 being the least significant bit of the k+2 most significant bits;

generating rounding bits;

selecting the k least significant bits of the k+2 most significant bits of said carry portion and the k least significant bits of the k+2 most significant bits of said sum portion of said second scaled dividend value w[0];

generating extra bits e2 and e1 of said second quotient-digit q[2], said extra bits e2 and e1 being the 2 least significant bits of the sum of bits 1 and 2 of the sum portion and bits 1 and 2 of the carry portion of the second scaled dividend value w[0];

comparing said extra bits e2 and e1 with the 2 least significant bits l2 and l1 of said quotient-digit q[1], generating correction bits in radix-4 booth notation;

forming quotient-digit q[2] in carry-save notation, said quotient-digit q[2] having k+2 bits in a carry portion and k+2 bits in a sum portion, bit 1 being the most significant bit of the k+2 bits and bit k+2 being the least significant bit of the k+2 bits, said step of forming comprising feeding said correction bits into bits 1 and 2 of the k+2 bits of the sum portion of q[2], feeding the k least significant bits of the k+2 most significant bits of the sum portion of said second scaled dividend value w[0] into bits 3 to k+2 of the sum portion of q[2], feeding the k least significant bits of the k+2 most significant bits of the carry portion of said second scaled dividend value w[0] into bits 3 to k+2 of the carry portion of q[2], and adding said rounding bits with bits k+2 of the sum portion of q[2] and the carry portion of q[2];

generating 2 least significant bits l2 and l1 of said second quotient-digit q[2] in single vector form;

storing the 2 least significant bits l2 and l1 of said second quotient-digit q[2];

re-coding said second quotient-digit q[2] from carry-save notation into radix-4 booth notation, generating said quotient-digit q[2] in radix-4 booth notation; and storing said quotient-digit q[2] in radix-4 booth notation in said quotient-digit register; and for iterations j (j=3 to N), generating quotient-digit q[j] by:

said quotient-digit generation unit receiving a partial remainder value w[j−2] from said MAC unit, said partial remainder value w[j−2] being generated during iteration j−2, and said partial remainder value w[j−2] being in carry-save notation, wherein said carry portion comprises 66 bits and said sum portion comprises 66 bits;

selecting the k+2 most significant bits of the carry portion and the k+2 most significant bits of the sum portion of said partial remainder value w[j−2], bit 1 being the most significant bit of the k+2 most significant bits and bit k+2 being the least significant bit of the k+2 most significant bits;

generating rounding bits;

selecting the k least significant bits of the k+2 most significant bits of said carry portion and the k least significant bits of the k+2 most significant bits of said sum portion of said partial remainder value w[j−2];

generating extra bits e2 and e1 of said quotient-digit q[j], said extra bits e2 and e1 being the 2 least significant bits of the sum of bits 1 and 2 of the sum portion and bits 1 and 2 of the carry portion of the partial remainder value w[j−2];

comparing said extra bits e2 and e1 with the 2 least significant bits l2 and l1 of said quotient-digit q[j], generating correction bits in radix-4 booth notation;

forming quotient-digit q[j] in carry-save notation, said quotient-digit q[j] having k+2 bits in a carry portion and k+2 bits in a sum portion, bit 1 being the most significant bit of the k+2 bits and bit k+2 being the least significant bit of the k+2 bits, said step of forming comprising feeding said correction bits into bits 1 and 2 of the k+2 bits of the sum portion of q[j], feeding the k least significant bits of the k+2 most significant bits of the sum portion of said partial remainder value w[j−2] into bits 3 to k+2 of the sum portion of q[j], feeding the k least significant bits of the k+2 most significant bits of the carry portion of said partial remainder value w[j−2] into bits 3 to k+2 of the carry portion of q[j], and adding said rounding bits with bits k+2 of the sum portion of q[j] and the carry portion of q[j];

generating 2 least significant bits l2 and l1 of said quotient-digit q[j] in single vector form;

storing the 2 least significant bits l2 and l1 of said quotient-digit q[j];

re-coding said quotient-digit q[j] from carry-save notation into radix-4 booth notation, generating said quotient-digit q[j] in radix-4 booth notation; and storing said quotient-digit q[j] in radix-4 booth notation in said quotient-digit register.

55. The pipelined division unit as recited in claim 53, wherein said MAC unit comprises a booth multiplexer, a partial remainder multiplexer, and first carry-save adder, a register and a second carry-save adder, and for iterations j (j=1 to N);

said booth multiplexer configured to receive said scaled divisor Y from said pre-processing unit and a quotient-digit q[j] from said quotient-digit generation unit, and generate a partial product according to the formula q[j]*Y;

said partial remainder multiplexer configured to receive a shifted second scaled dividend value r*w[0] from said pre-processing unit and shifted partial remainder values r*w[j] from an output of said second carry-save adder of said MAC unit, and for iteration 1, said partial remainder multiplexer passes said shifted second scaled dividend value r*w[0] to said first carry-save adder, and for iterations j (j=2 to N), said partial remainder multiplexer passes shifted partial remainder values r*w[j−1] to said first carry-save adder; and said first carry-save adder configured to receive said partial product from said booth multiplexer and said second scaled dividend value r*w[0] from said pre-processor unit or said shifted partial remainder values r*w[j−1] from said MAC unit and perform a first carry-save addition operation on those values, generating a first carry-save result;

said register configured to receive said first carry-save result from said first carry-save adder; and said second carry save adder configured to receive said first carry-save result from said register and perform a second carry save operation, generating a partial remainder value w[j].

56. The pipelined division unit as recited in claim 53, wherein said quotient-digit accumulator unit receives said quotient-digits q[1]–q[N] from said quotient-digit generation unit and accumulates the quotient-digits into a final quotient result Q.

57. The pipelined division unit as recited in claim 56, wherein said quotient-digit accumulator unit comprises a quotient-digit generator/accumulator, a zero-digit determination unit, and a round unit;

said quotient-digit generator/accumulator configured to accumulate said quotient-digits into final quotient result Q;

said zero-digit determination unit configured to receive the last partial remainder value w[N] from said MAC unit and determine if the value of said last partial remainder value w[N] is zero; and said round unit configured to receive a value from said zero-digit determination unit and a value from said quotient-digit generator/accumulator and generate a rounding bit to be used to round said quotient result Q, said rounding bit being a function of the value received from said zero-determination unit.

58. The pipelined division unit as recited in claim 57, further comprising a sign determination unit, and wherein for each iteration j (j=1 to N);

said sign determination unit being configured to receive partial remainder value w[j] from said MAC unit, and determine the sign of said partial remainder value w[j] by analyzing the sign bit of said partial remainder value w[j];

said quotient-digit generator/accumulator configured to receive quotient-digit q[j] from said quotient-digit generation unit, and said sign bit of said partial remainder value w[j] from said sign determination unit, and determine a value q_z[j] for said quotient-digit q[j] based on the formula:

q_z[j]=q[j]; is said sign bit=0; and q_z[j]=q[j]−1; if said sign bit=1; and said quotient-digit accumulator configured to accumulate said quotient result Q according to the formula:

$$Q = \sum_{j=1}^{N} q\_z[j] * r^{-j}$$

59. The pipelined division unit as recited in claim 58, wherein said quotient result Q and said rounding bit pass from said quotient-digit accumulator unit to said post processing unit, said post processing unit generating the final quotient value based on said quotient result Q and said rounding bit in accordance with IEEE standard 754, said post processing unit further generating said division result of a division operation by combining the final quotient value with said newly calculated exponent value.

60. In a processor comprising a pipelined division unit for performing division operations, a pre-processing unit for generating a scaling factor M, and for using said scaling factor M to generate a scaled divisor Y, a first scaled dividend value w[00] and a second scaled dividend value w[0] for each division operation, said pre-processing unit comprising:

a first register for holding a divisor DR in floating-point form, said divisor DR comprising a fraction value and an exponent value;

a second register for holding a dividend value DD in floating point form, said dividend value DD comprising a fraction value and an exponent value;

an exponent unit for calculating said result exponent value by subtracting the exponent value of divisor DR from the exponent value of dividend DD;

a scaling factor generation unit for generating said scaling factor M;

a divisor pre-scaling unit for scaling divisor DR using scaling factor M, generating a scaled divisor Y; and a dividend pre-scaling unit for scaling dividend DD using scaling factor M, generating said first scaled dividend value w[00] and said second scaled dividend value w[0].

61. The pre-processing unit as recited in claim 60, further comprising a normalization unit for normalizing the fraction value of divisor DR and the fraction value of dividend DD if the fraction value of divisor DR or the fraction value of dividend DD are not in normal form.

62. The pre-processing unit as recited in claim 60, further comprising a compare unit and a shift unit, said compare unit for comparing the fraction normalized value of divisor DR with the fraction normalized value of dividend DD, and said shift unit for left shifting the bits of the fraction value of dividend DD one bit if the fraction normalized value of dividend DD is less than the fraction normalized value of divisor DR.

63. The pre-processing unit as recited in claim 60, further comprising a carry-propagate adder, which receives said scaled divisor Y from said divisor pre-scaling unit in carry-save notation and transforms at least a portion of the scaled divisor Y from carry-save notation into a single vector value.

64. The pre-processing unit as recited in claim 60, wherein said scaling factor generation unit comprises:

a table select unit for generating one or more table values;

a first scaling sub-factor generation unit configured to receive at least one of said one or more table values from said table select unit and bits from the fraction value of said divisor DR to generate a first scaling sub-factor M1; and a second scaling sub-factor generation unit configured to receive at least one of said one or more table values from said table select unit and bits from the fraction value of said divisor DR to generate a second scaling sub-factor M2.

65. The pre-processing unit as recited in claim 64, wherein said scaling factor generation unit further comprises a booth recoder unit for re-coding scaling sub-factors M1 and M2 from carry-save notation to radix-4 booth notation.

66. The pre-processing unit as recited in claim 64, wherein for a radix $r=2^k=512$ (k=9):

said scaling factor generation unit is configured to receive the 20 most significant bits of the fraction bits of divisor DR ($DR_{20msb}$), $DR_{20msb}$ comprising 5 sets of 4 bits, $DR_{20msb(0-3)}$, $DR_{20msb(4-7)}$, $DR_{20msb(8-11)}$, $DR_{20msb(12-15)}$, $DR_{20msb(16-19)}$, wherein $DR_{20msb(0-3)}$ comprises the 4 least signficant bits of $DR_{20msb}$ and $DR_{20msb(16-19)}$ comprises the 4 most significant bits of $DR_{20msb}$;

said table select unit is configured to generate;
  (1) a first table look-up value T1 from a table using the 8 most significant bits of $DR_{20msb}$ ($DR_{20msb(16-19)}$ and $DR_{20msb(12-15)}$), said first table look-up value T1 being 25 bits;
  (2) a second table look-up value T2 from a table using the 8 most significant bits of $DR_{20msb}$ ($DR_{20msb(16-19)}$ and $DR_{20msb(12-15)}$), said second table look-up value T2 being 16 bits; and
  (3) a third table look-up value T3 using said bits $DR_{20msb(16-19)}$ and $DR_{20msb(8-11)}$, said third table look-up value T3 being 7 bits;

said first scaling sub-factor generation unit is configured to generate a scaling sub-factor M1 using said bits $DR_{20msb(8-11)}$, the 14 most significant bits of T1 ($T1_{14msb}$) and the 5 most significant bits of T2 ($T2_{5msb}$), according to the formula $M1=T1_{14msb}+T2_{5msb}*DR_{20msb(8-11)}$; and said second scaling sub-factor generation unit is configured to generate a scaling sub-factor M2 using the 12 least significant bits of $DR_{20msb}$ ($DR_{20msb(8-11)}$, $DR_{20msb(4-7)}$, and $DR_{20msb(0-3)}=DR_{20msb(12lsb)}$), the 16 least significant bits of T1 ($T1_{16lsb}$), all 16 bits of T2, and all 7 bits of T3, according to the formula $M2=T1_{16lsb}+T2*DR_{20msb(12lsb)}+T3$.

67. The pre-processing unit as recited in claim 66, wherein scaling sub-factors M1 and M2 are generated in carry-save notation.

68. The pre-processing unit as recited in claim 66, wherein said scaling factor generation unit further comprises a mulitplexer, and a booth recoder unit, and wherein said scaling factor generation unit is configured to generate correction bits c for scaling sub-factor M2 in accordance with the method comprising the steps of:

said multiplexer receiving from first and second scaling sub-factor generation units scaling sub-factors M1 and M2, respectively;

said booth recoder first receiving scaling sub-factor M1 from said mulitplexer and re-coding sub-factor M1 from carry-save notation to radix-4 booth notation;

storing sub-factor M1 in radix-4 booth notation;

said booth recoder then receiving scaling sub-factor M2 from said muliplexer in carry-save notation;

obtaining the 2 least significant bits (l2 and l1) of M1;

obtaining the 2 most significant bits (e2 and e1)of M2;

calculating correction bits c using l2, and l1, e2, and e1 in accordance with the formula c=(e2, e1)−(l2, and l1)=(0, −1, −2); and setting the 2 most significant bits of M2 to correction bits c.

69. The pre-processing unit as recited in claim 64, wherein said first and said second scaling sub-factor generation units generate scaling sub-factors M1 and M2 using a linear interpolation method.

70. The pre-processing unit as recited in claim 60, wherein said divisor pre-scaling unit comprises a partial product generator (PPG), a multiplexer, a first carry-save adder, and a second carry-save adder, and wherein said divisor pre-scaling unit scales said divisor by:

said PPG receiving the fraction value of said divisor DR from said first register holding the fraction value of said divisor DR, and receiving said scaling sub-factors M1 and M2 from said scaling factor generation unit;

said PPG, said first carry-save adder, said second carry-save adder, and said multiplexer generating partial products and performing multiplication and addition operations with the fraction value of said divisor DR and said scaling sub-factors M1 and M2, generating a scaled divisor Y.

71. The pre-processing unit as recited in claim 70, wherein said scaled divisor Y is in carry-save notation, and wherein said pre-processing unit further comprises a carry-propagate adder, which coverts a least a portion of scaled divisor Y from carry-save notation to a single vector value.

72. The pre-processing unit as recited in claim 70, wherein said pre-processing unit further comprises a divisor multiplexer and a normalization unit;

said normalization unit for normalizing said divisor DR if said divisor DR is not in normal form; and said divisor muliplexer configured to receive said divisor DR from said first register and/or receive a normalized divisor from said normalization unit, and pass said divisor DR from said first register to said PPG if said divisor DR does not need normalization, or pass said normalized divisor to said PPG if said divisor DR does need normalization.

73. The pre-processing unit as recited in claim 70, wherein said divisor pre-scaling unit generates said scaled divisor Y according to the formula $Y=DR*M=r(DR*M1)+DR*M2$, and wherein scaling sub-factors M1 and M2 are generated such that the value of scaled divisor Y is close to 1.

74. The pre-processing unit as recited in claim 60, wherein said dividend pre-scaling: unit comprises a partial product generator (PPG), a multiplexer, a first carry-save adder, and a second carry-save adder, and wherein said dividend pre-scaling unit scales said dividend by:

said PPG receiving the fraction value of said dividend DD from said second register holding the fraction value of said dividend DD, and receiving said scaling sub-factors M1 and M2 from said scaling factor generation unit;

said PPG, said first carry-save adder, said second carry-save adder, and said multiplexer generating partial products and performing multiplication and addition operations with the fraction value of said dividend DD and said scaling sub-factors M1 and M2, generating a first partial remainder w[00] and a second partial remainder w[0].

75. The pre-processing unit as recited in claim 74, wherein said pre-processing unit further comprises a dividend multiplexer and a normalization unit;

said normalization unit for normalizing said dividend DD if said dividend DD is not in normal form; and said dividend muliplexer configured to receive said dividend DD from said second register and/or receive a normalized dividend from said normalization unit, and pass said dividend DD from said second register to said PPG if said normalization unit does not normalize said dividend DD, or pass said normalized dividend to said PPG if said normalization unit does normalize said dividend DD.

76. The pre-processing unit as recited in claim 74, wherein said dividend pre-scaling unit generates said first scaled dividend value w[00] according to the formula w[00]=DD*M1, and wherein said dividend pre-scaling unit generates said second scaled dividend value w[0] according to the formula w[0]=DD*M=r(DD*M1)+DD*M2.

77. In a processor comprising a pipelined division unit for performing division operations, an iteration unit being configured to receive a scaled divisor Y, a first scaled dividend value w[00], and a second scaled dividend value w[0] and perform a plurality of iterations to generate a plurality of quotient-digits, and wherein each of said plurality of iterations is performed in two short clock cycles and said plurality of iterations overlap, such that a first iteration is performed during a first clock cycle and a second clock cycle using the first scaled dividend value w[00], and a second iteration is performed during said second clock cycle and a third clock cycle using the second scaled dividend value w[0].

78. The iteration unit as recited in claim 77, wherein a third iteration is performed during the third clock cycle and a forth clock cycle using a partial remainder value generated in the first iteration.

79. The iteration unit as recited in claim 78, wherein one or more subsequent iterations X are performed in subsequent overlapping clock cycles using a partial remainder value generated in iteration X–2.

80. In a processor comprising a pipelined division unit for performing division operations, an iteration unit comprising a quotient-digit generation unit, a multiply-accumulate (MAC) unit, and a quotient-digit accumulator unit, and wherein the iteration unit receives a scaled divisor Y, a first scaled dividend value w[00], and a second scaled dividend value w[0] from said pre-processing unit and performs division iterations using said scaled divisor Y, said first scaled dividend value w[00], and said second scaled dividend value w[0].

81. The iteration unit as recited in claim 80, wherein 'n' is the total number of quotient-digits to be generated, 'k' is the number of quotient-bits generated in a single iteration, and N is the number of iterations needed to determine all quotient-bits n, such that the relationship N=n/k applies and a radix $r=2^k$, and wherein said iteration unit generates quotient-digits by performing a method comprising the steps of:

performing a first iteration by:
said quotient-digit generation unit receiving said first scaled dividend value w[00] from said pre-processing unit and generating a first quotient-digit q[1] according to the formula q[1]=SEL($r^2w_{msb}$[00]); and
said MAC unit receiving said scaled divisor Y and a shifted second dividend value r*w[0] from pre-processing unit, and first quotient-digit q[1] from said quotient-digit generation unit, and said MAC unit generating a partial remainder w[1] according to the formula w[1]=r*w[0]−q[1]*Y;

performing a second iteration by:
said quotient-digit generation unit receiving said second scaled dividend value w[0] from said pre-processing unit, and generating a second quotient-digit q[2] according to the formula q[2]=SEL($r^2w_{msb}$[0], q[1]) during the same clock cycle that said MAC unit is generating partial remainder w[1]; and
said MAC unit receiving a shifted partial remainder value r*w[1] from an output of said MAC unit, and second quotient-digit q[2] from said quotient-digit generation unit, and said MAC unit generating a partial remainder w[2] according to the formula w[2]=r*w[1]−q[2]*Y;

performing subsequent iterations j, wherein j=3 to N, said subsequent iterations comprising the steps of:
said quotient-digit generation unit;
receiving said partial remainder value w[j−2] from said MAC unit, said partial remainder value w[j−2] being generated by said MAC unit during iteration j−2; and
using said partial remainder value w[j−2] and quotient-digit q[j−1] generated during iteration j−1, generating a quotient-digit q[j] according to the formula q[j]=SEL ($r^2w_{msb}$[j−2], q[j−1]) during the same clock cycle that said MAC unit is generating partial remainder w[j−1]; and
during the next clock cycle, said MAC unit receiving a shifted partial remainder value r*w[j−1] from said output of said MAC unit, and receiving quotient-digit q[j] from said quotient-digit generation unit, and said MAC unit generating a partial remainder w[j] according to the formula w[j]=r*w[j−1]−q[j]*Y.

82. The iteration unit as recited in claim 81, wherein said quotient-digit generation unit further comprises a recoder unit and a quotient-digit register, said quotient-digit generation unit generating quotient-digits q[j] (j=1 to N) by performing a quotient-digit selection by rounding method, said method comprising the steps of:

generating first quotient-digit q[1] by:
said quotient-digit generation unit receiving said first scaled dividend value w[00] from said pre-processing unit, said first scaled dividend value w[00] being in carry-save notation, wherein said carry portion comprises 66 bits and said sum portion comprises 66 bits;
selecting the k+2 most significant bits of the carry portion and the k+2 most significant bits of the sum portion of said first scaled dividend value w[00], bit 1 being the most significant bit of the k+2 most significant bits and bit k+2 being the least significant bit of the k+2 most significant bits;
generating rounding bits;
selecting the k least significant bits of the k+2 most significant bits of said carry portion and the k least significant bits of the k+2 most significant bits of said sum portion of said first scaled dividend value w[00];
generating said first quotient-digit q[1] in carry-save form as a sum of said k least significant bits of the k+2 most significant bits of said carry portion, said k least significant bits of the k+2 most significant bits of said sum portion, and said rounding bits;
generating 2 least significant bits l2 and l1 of said first quotient-digit q[1] in single vector form;
storing said 2 least significant bits l2 and l1 of said first quotient-digit q[1];
re-coding said first quotient-digit q[1] from carry-save notation into radix-4 booth notation, generating said quotient-digit q[1] in radix-4 booth notation; and
storing said quotient-digit q[1] in radix-4 booth notation in said quotient-digit register;

generating second quotient-digit q[2] by:
  said quotient-digit generation unit receiving said second scaled dividend value w[0] from said pre-processing unit, said second scaled dividend value w[0] being in carry-save notation, wherein said carry portion comprises 66 bits and said sum portion comprises 66 bits;
  selecting the k+2 most significant bits of the carry portion and the k+2 most significant bits of the sum portion of said second scaled dividend value w[0], bit 1 being the most significant bit of the k+2 most significant bits and bit k+2 being the least significant bit of the k+2 most significant bits;
  generating rounding bits;
  selecting the k least significant bits of the k+2 most significant bits of said carry portion and the k least significant bits of the k+2 most significant bits of said sum portion of said second scaled dividend value w[0];
  generating extra bits e2 and e1 of said second quotient-digit q[2], said extra bits e2 and e1 being the 2 least significant bits of the sum of bits 1 and 2 of the sum portion and bits 1 and 2 of the carry portion of the second scaled dividend value w[0];
  comparing said extra bits e2 and e1 with the 2 least significant bits l2 and l1 of said quotient-digit q[1], generating correction bits in radix-4 booth notation;
  forming quotient-digit q[2] in carry-save notation, said quotient-digit q[2] having k+2 bits in a carry portion and k+2 bits in a sum portion, bit 1 being the most significant bit of the k+2 bits and bit k+2 being the least significant bit of the k+2 bits, said step of forming comprising feeding said correction bits into bits 1 and 2 of the k+2 bits of the sum portion of q[2], feeding the k least significant bits of the k+2 most significant bits of the sum portion of said second scaled dividend value w[0] into bits 3 to k+2 of the sum portion of q[2], feeding the k least significant bits of the k+2 most significant bits of the carry portion of said second scaled dividend value w[0] into bits 3 to k+2 of the carry portion of q[2], and adding said rounding bits with bits k+2 of the sum portion of q[2] and the carry portion of q[2];
  generating 2 least significant bits l2 and l1 of said second quotient-digit q[2] in single vector form;
  storing the 2 least significant bits l2 and l1 of said second quotient-digit q[2];
  re-coding said second quotient-digit q[2] from carry-save notation into radix-4 booth notation, generating said quotient-digit q[2] in radix-4 booth notation; and
  storing said quotient-digit q[2] in radix-4 booth notation in said quotient-digit register; and
for iterations j (j=3 to N), generating quotient-digit q[j] by:
  said quotient-digit generation unit receiving a partial remainder value w[j−2] from said MAC unit, said partial remainder value w[j−2] being generated during iteration j−2, and said partial remainder value w[j−2] being in carry-save notation, wherein said carry portion comprises 66 bits and said sum portion comprises 66 bits;
  selecting the k+2 most significant bits of the carry portion and the k+2 most significant bits of the sum portion of said partial remainder value w[j−2], bit 1 being the most significant bit of the k+2 most significant bits and bit k+2 being the least significant bit of the k+2 most significant bits;
  generating rounding bits;
  selecting the k least significant bits of the k+2 most significant bits of said carry portion and the k least significant bits of the k+2 most significant bits of said sum portion of said partial remainder value w[j−2];
  generating extra bits e2 and e1 of said quotient-digit q[j], said extra bits e2 and e1 being the 2 least significant bits of the sum of bits 1 and 2 of the sum portion and bits 1 and 2 of the carry portion of the partial remainder value w[j−2];
  comparing said extra bits e2 and e1 with the 2 least significant bits l2 and l1 of said quotient-digit q[j], generating correction bits in radix-4 booth notation;
  forming quotient-digit q[j] in carry-save notation, said quotient-digit q[j] having k+2 bits in a carry portion and k+2 bits in a sum portion, bit 1 being the most significant bit of the k+2 bits and bit k+2 being the least significant bit of the k+2 bits, said step of forming comprising feeding said correction bits into bits 1 and 2 of the k+2 bits of the sum portion of q[j], feeding the k least significant bits of the k+2 most significant bits of the sum portion of said partial remainder value w[j−2] into bits 3 to k+2 of the sum portion of q[j], feeding the k least significant bits of the k+2 most significant bits of the carry portion of said partial remainder value w[j−2] into bits 3 to k+2 of the carry portion of q[j], and adding said rounding bits with bits k+2 of the sum portion of q[j] and the carry portion of q[j];
  generating 2 least significant bits l2 and l1 of said quotient-digit q[j] in single vector form;
  storing the 2 least significant bits l2 and l1 of said quotient-digit q[j];
  re-coding said quotient-digit q[j] from carry-save notation into radix-4 booth notation, generating said quotient-digit q[j] in radix-4 booth notation; and
  storing said quotient-digit q[j] in radix-4 booth notation in said quotient-digit register.

83. The iteration unit as recited in claim 81, wherein said MAC unit comprises a booth multiplexer, a partial remainder multiplexer, and first carry-save adder, a register and a second carry-save adder, and for iterations j (j=1 to N);
  said booth multiplexer configured to receive said scaled divisor Y from said pre-processing unit and a quotient-digit q[j] from said quotient-digit generation unit, and generate a partial product according to the formula q[j]*Y;
  said partial remainder multiplexer configured to receive a shifted second scaled dividend value r*w[0] from said pre-processing unit and shifted partial remainder values r*w[j] from an output of said second carry-save adder of said MAC unit, and for iteration 1, said partial remainder multiplexer passes said shifted second scaled dividend value r*w[0] to said first carry-save adder, and for iterations j (j=2 to N), said partial remainder multiplexer passes shifted partial remainder values r*w[j−1] to said first carry-save adder; and
  said first carry-save adder configured to receive said partial product from said booth multiplexer and said second scaled dividend value r*w[0] from said pre-processor unit or said shifted partial remainder values r*w[j−1] from said MAC unit and perform a first carry-save addition operation on those values, generating a first carry-save result;
  said register configured to receive said first carry-save result from said first carry-save adder; and said second carry save adder configured to receive said first carry-save result from said register and perform a second carry save operation, generating a partial remainder value w[j].

84. The iteration unit as recited in claim 81, wherein said quotient-digit accumulator unit receives said quotient-digits q[1]–q[N] from said quotient-digit generation unit and accumulates the quotient-digits into a final quotient result Q.

85. The iteration unit as recited in claim 84, wherein said quotient-digit accumulator unit comprises a quotient-digit generator/accumulator, a zero-digit determination unit, and a round unit;

said quotient-digit generator/accumulator configured to accumulate said quotient-digits into final quotient result Q;

said zero-digit determination unit configured to receive the last partial remainder value w[N] from said MAC unit and determine if the value of said last partial remainder value w[N] is zero; and said round unit configured to receive a value from said zero-digit determination unit, said value being a function of whether said last partial remainder value w[N] is zero, and said round unit configured to generate a rounding bit to be used to round said quotient result Q, said rounding bit being a function of the value received from said zero-determination unit.

86. The iteration unit as recited in claim 85, further comprising a sign determination unit, and wherein for each iteration j (j=1 to N);

said sign determination unit being configured to receive partial remainder value w[j] from said MAC unit, and determine the sign of said partial remainder value w[j] by analyzing the sign bit of said partial remainder value w[j];

said quotient-digit generator/accumulator configured to receive quotient-digit q[j] from said quotient-digit generation unit, and said sign bit of said partial remainder value w[j] from said sign determination unit, and determine a value q_z[j] for said quotient-digit q[j] based on the formula:

$q\_z[j]=q[j]$; is said sign bit=0; and $q\_z[j]=q[j]-1$; if said sign bit=1; and said quotient-digit accumulator configured to accumulate said quotient result Q according to the formula:

$$Q = \sum_{j=1}^{N} q\_z[j] * r^{-j}$$

87. The iteration unit as recited in claim 86, wherein said quotient result Q and said rounding bit pass from said quotient-digit accumulator unit to said post processing unit, said post processing unit generating the final quotient value based on said quotient result Q and said rounding bit in accordance with IEEE standard 754, said post processing unit further generating said division result of a division operation by combining the final quotient value with said newly calculated exponent value.

* * * * *

UNITED STATES PATENT AND TRADEMARK OFFICE
CERTIFICATE OF CORRECTION

PATENT NO. : 6,751,645 B1
DATED : June 15, 2004
INVENTOR(S) : Valery Y. Gorshtein et al.

It is certified that error appears in the above-identified patent and that said Letters Patent is hereby corrected as shown below:

Column 26,
Line 19, after "accordance with the formula c-(e2,e1)" delete "(l2, and l1)" and insert -- (l2, l1) --

Column 28,
Line 44, after "wherein said" delete "quotient-digit :generation" and insert -- quotient-digit generation --

Column 33,
Line 65, after "calculating correction bits c using" delete "l2, and l1," and insert -- l2, l1, --
Line 66, after "accordance with the formula c-(e2,e1)" delete "(l2, and l1)" and insert -- (l2, l1) --

Column 36,
Line 28, after "according to the formula" delete "w[j=r*w[j-1]-q]*Y" and insert -- w[j] =r*w[j-1]-q[j]*Y --

Signed and Sealed this

Fourteenth Day of September, 2004

JON W. DUDAS
*Director of the United States Patent and Trademark Office*